United States Patent
Naizer et al.

(10) Patent No.: US 10,106,332 B2
(45) Date of Patent: Oct. 23, 2018

(54) APPARATUS AND METHODS FOR ASSISTING IN VARYING THE AMOUNT OF MATERIAL DELIVERED FROM A CONVEYOR

(71) Applicant: BJ Services, LLC, Tomball, TX (US)

(72) Inventors: Brent Naizer, Tomball, TX (US); Ronnie Hughes, Montgomery, TX (US)

(73) Assignee: BJ Services, LLC, Tomball, TX (US)

( * ) Notice: Subject to any disclaimer, the term of this patent is extended or adjusted under 35 U.S.C. 154(b) by 114 days.

(21) Appl. No.: 15/042,638

(22) Filed: Feb. 12, 2016

(65) Prior Publication Data
US 2016/0167890 A1 Jun. 16, 2016

Related U.S. Application Data

(63) Continuation of application No. 13/740,835, filed on Jan. 14, 2013, now Pat. No. 9,260,253, which is a continuation-in-part of application No. 13/568,468, filed on Aug. 7, 2012, now Pat. No. 9,038,865.

(51) Int. Cl.
| | |
|---|---|
| *G01G 11/12* | (2006.01) |
| *B65G 43/08* | (2006.01) |
| *B65G 43/00* | (2006.01) |
| *B65G 65/42* | (2006.01) |
| *B65G 47/19* | (2006.01) |

(52) U.S. Cl.
CPC ............ *B65G 43/08* (2013.01); *B65G 43/00* (2013.01); *B65G 47/19* (2013.01); *B65G 65/42* (2013.01); *G01G 11/12* (2013.01)

(58) Field of Classification Search
CPC ......... G01G 11/00–11/20; B65G 43/00; B65G 43/08; B65G 47/19; B65G 65/42
See application file for complete search history.

(56) References Cited

U.S. PATENT DOCUMENTS

| | | | | |
|---|---|---|---|---|
| 3,603,416 | A * | 9/1971 | Spurlin | B65G 39/04 177/1 |
| 4,475,669 | A * | 10/1984 | Wahl | G01G 11/12 177/121 |
| 5,044,819 | A * | 9/1991 | Kilheffer | E01C 19/46 177/119 |
| 5,384,436 | A * | 1/1995 | Pritchard | A01F 15/0875 100/99 |
| 5,670,752 | A * | 9/1997 | Nakajima | G01G 11/003 177/119 |
| 5,880,407 | A * | 3/1999 | Flammang | G01G 13/026 177/119 |
| 6,066,809 | A * | 5/2000 | Campbell | G01G 11/003 177/119 |
| 6,244,782 | B1 * | 6/2001 | Bitelli | E01C 19/48 198/841 |

(Continued)

*Primary Examiner* — Randy Gibson
(74) *Attorney, Agent, or Firm* — Keith B. Willhelm

(57) ABSTRACT

Automatically adjusting the amount of material delivered by a conveyor belt includes measuring the speed of a drive pulley that drives the conveyor belt and determining the weight of material dispensed onto the conveyor belt from at least one material dispenser on a real-time, ongoing basis. Based at least in part upon such speed and weight measurements, an electronic controller repeatedly adjusts the speed of the conveyor belt by dictating the output of at least one motor that drives the drive pulley.

20 Claims, 11 Drawing Sheets

(56) References Cited

U.S. PATENT DOCUMENTS

| | | | | |
|---|---|---|---|---|
| 6,329,613 | B1* | 12/2001 | Tomlinson | G01G 11/00 177/145 |
| 7,193,162 | B2* | 3/2007 | McIsaac | G01F 1/76 177/1 |
| 8,067,704 | B2* | 11/2011 | Lowe | G01G 11/12 177/121 |
| 9,038,865 | B2* | 5/2015 | Naizer | B65D 90/587 198/532 |
| 9,260,253 | B2* | 2/2016 | Naizer | B65G 43/00 |

* cited by examiner

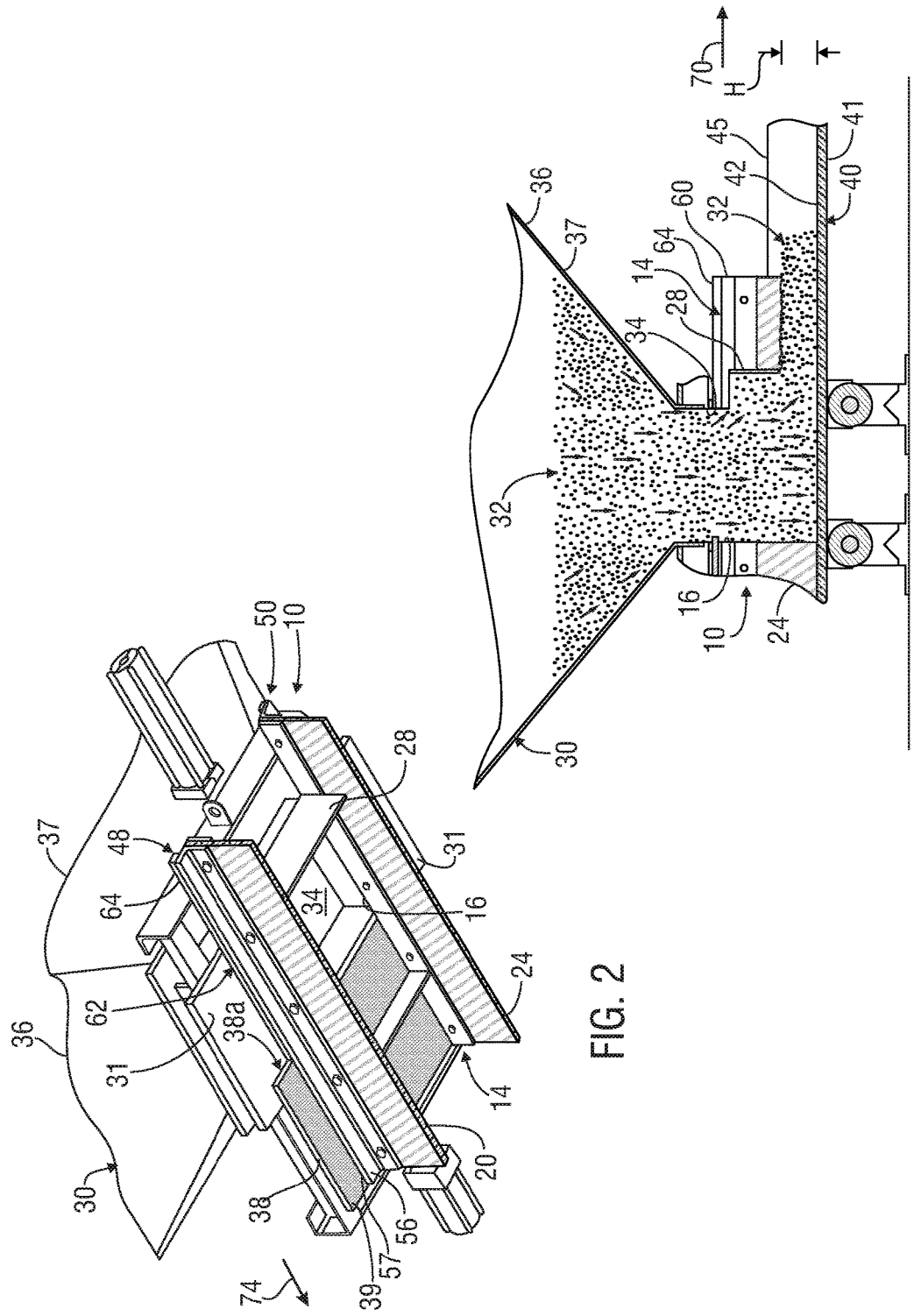

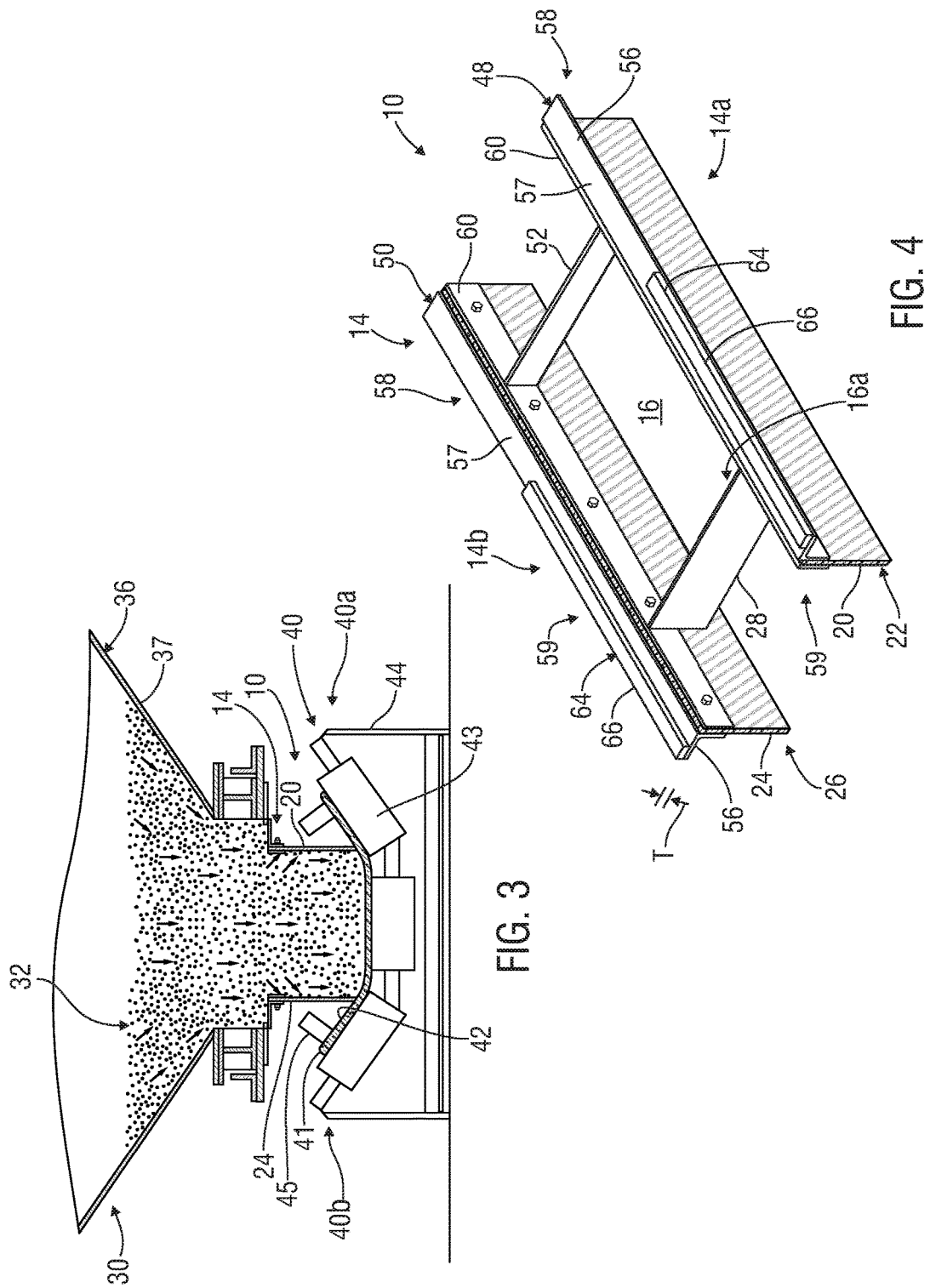

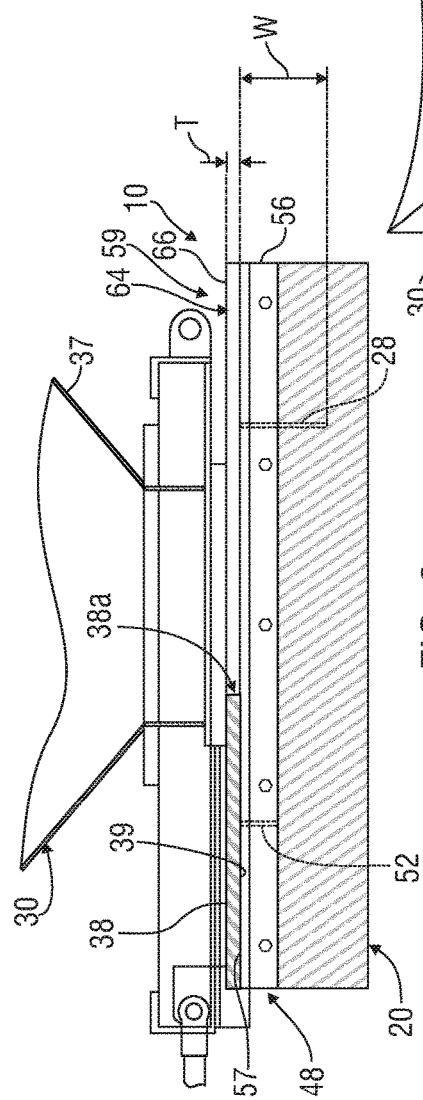
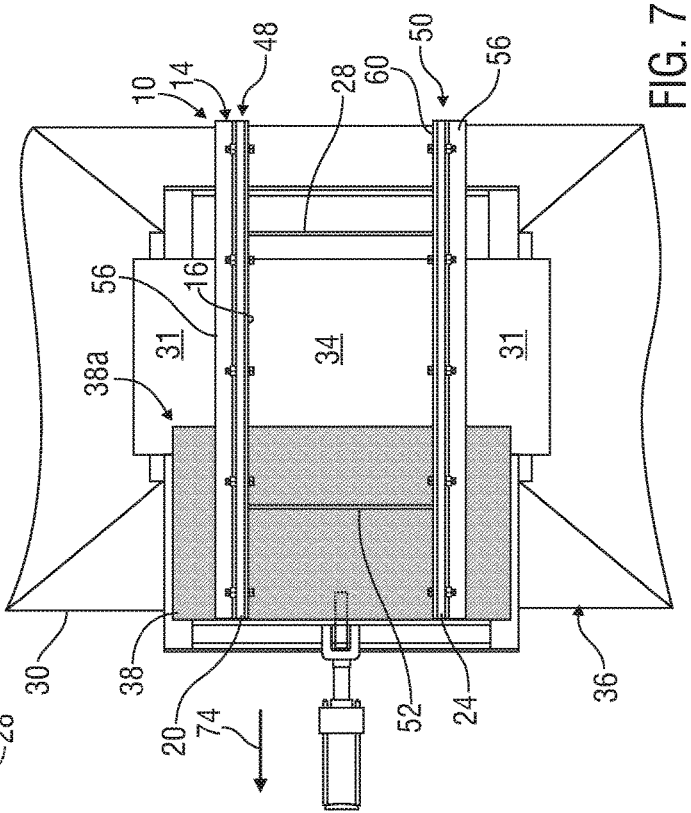

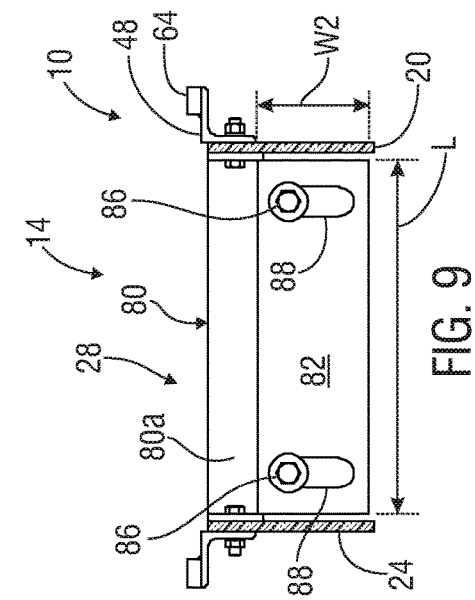
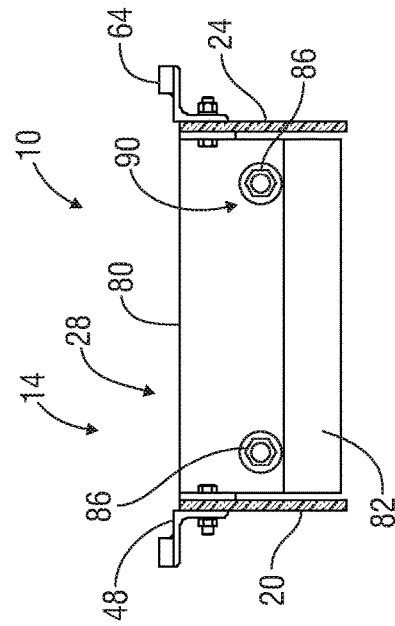
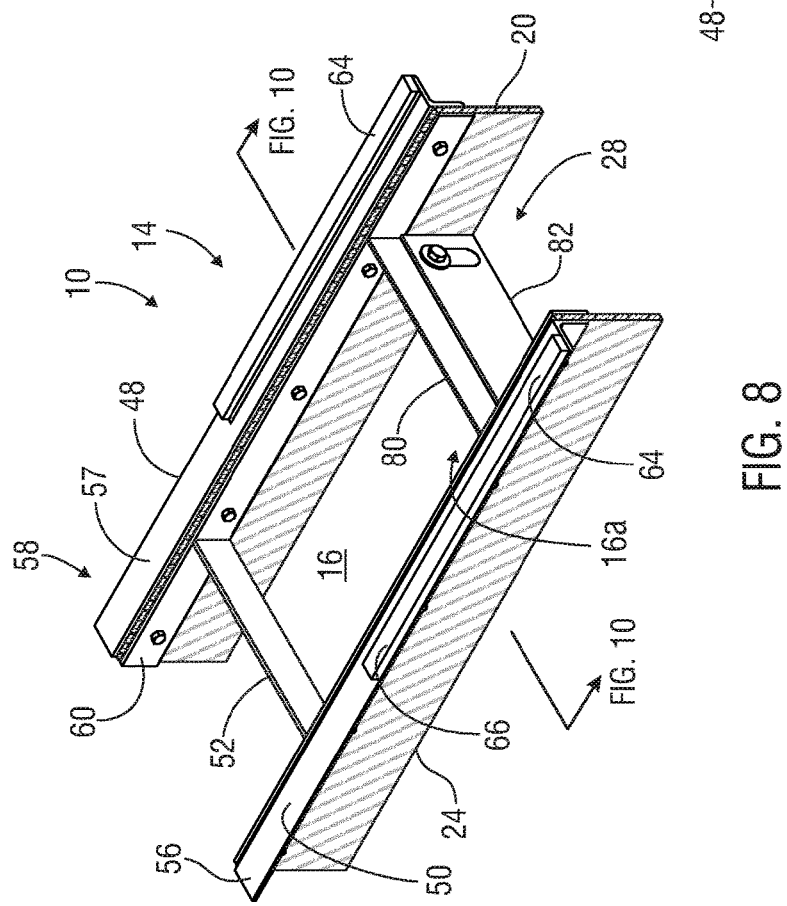

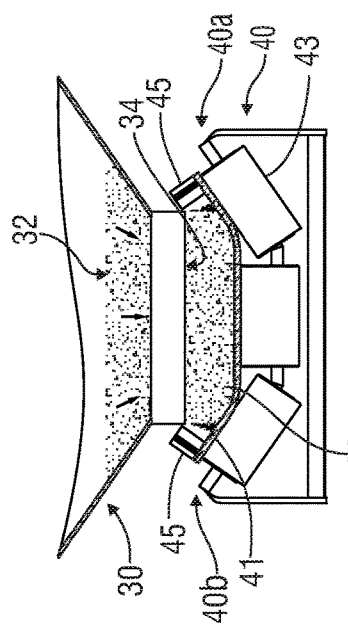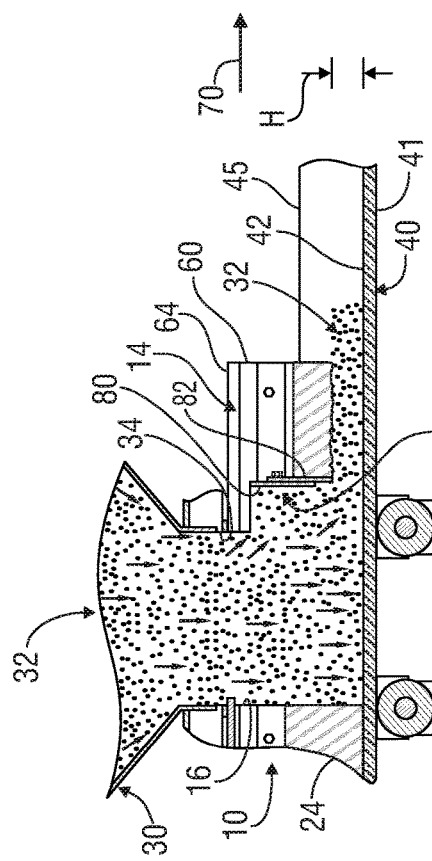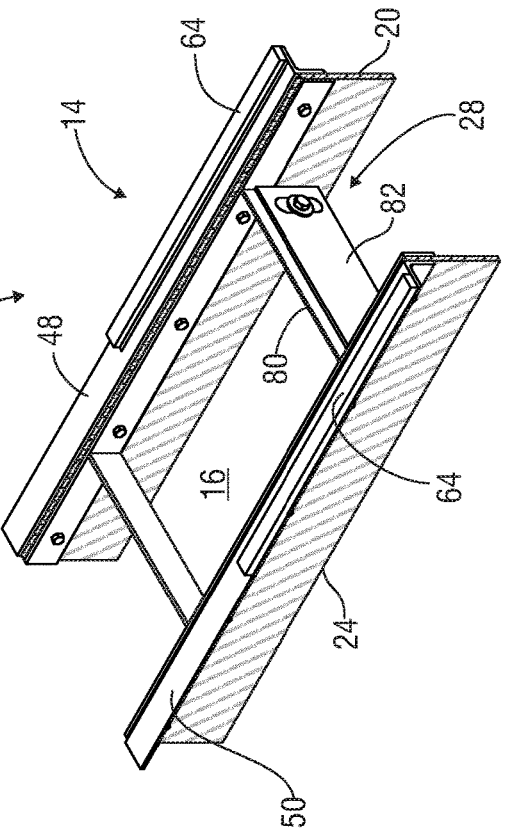

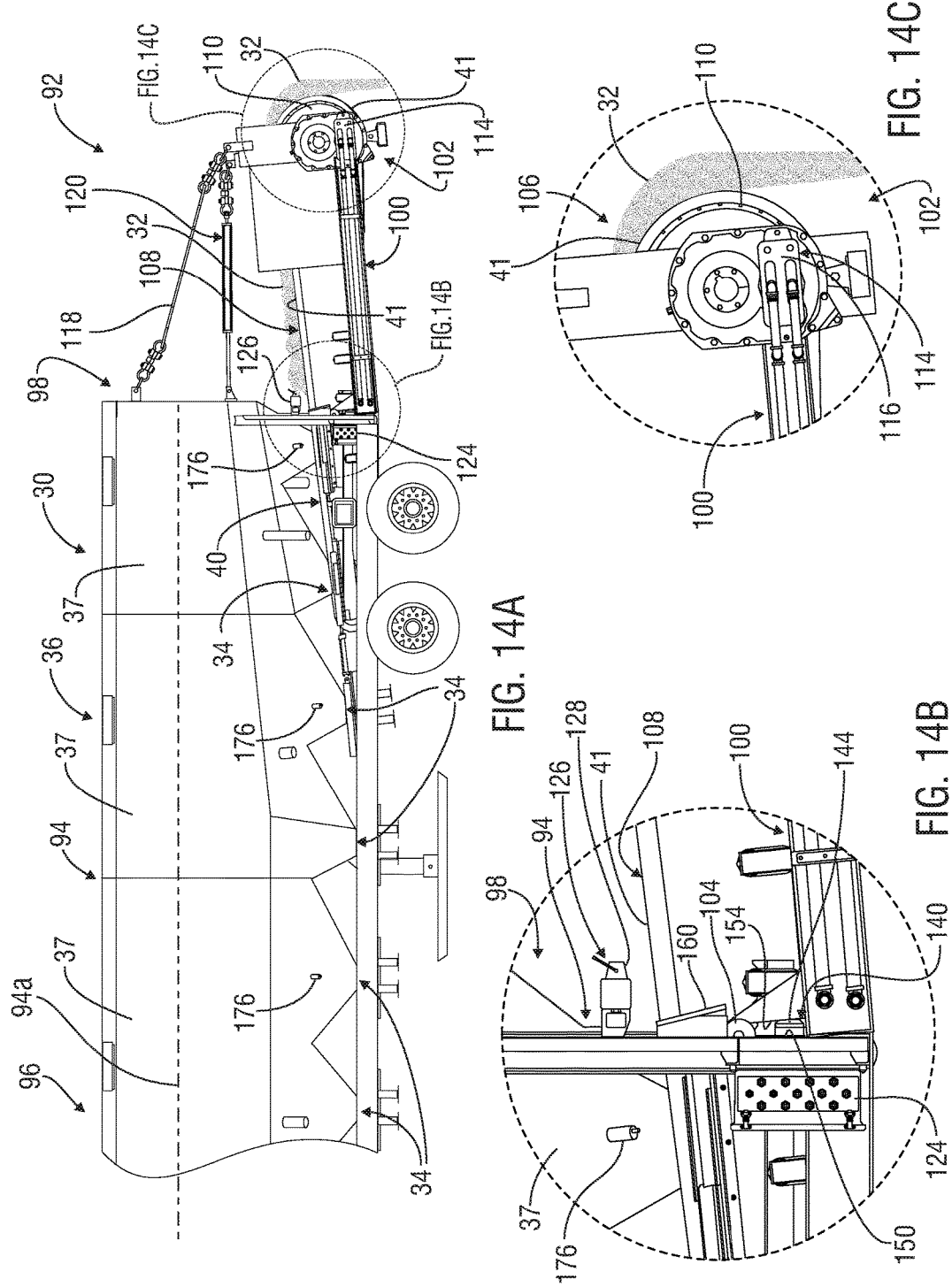

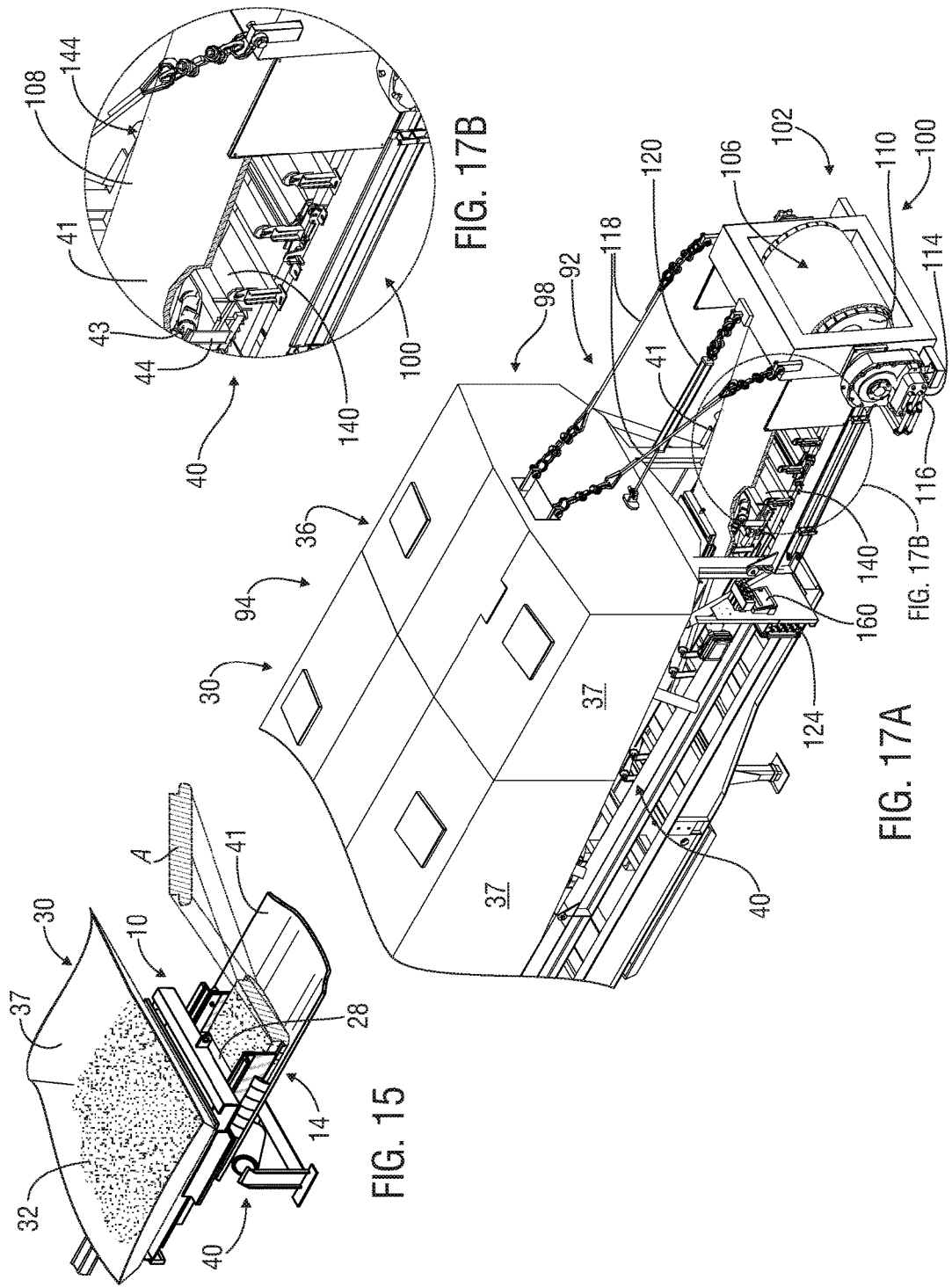

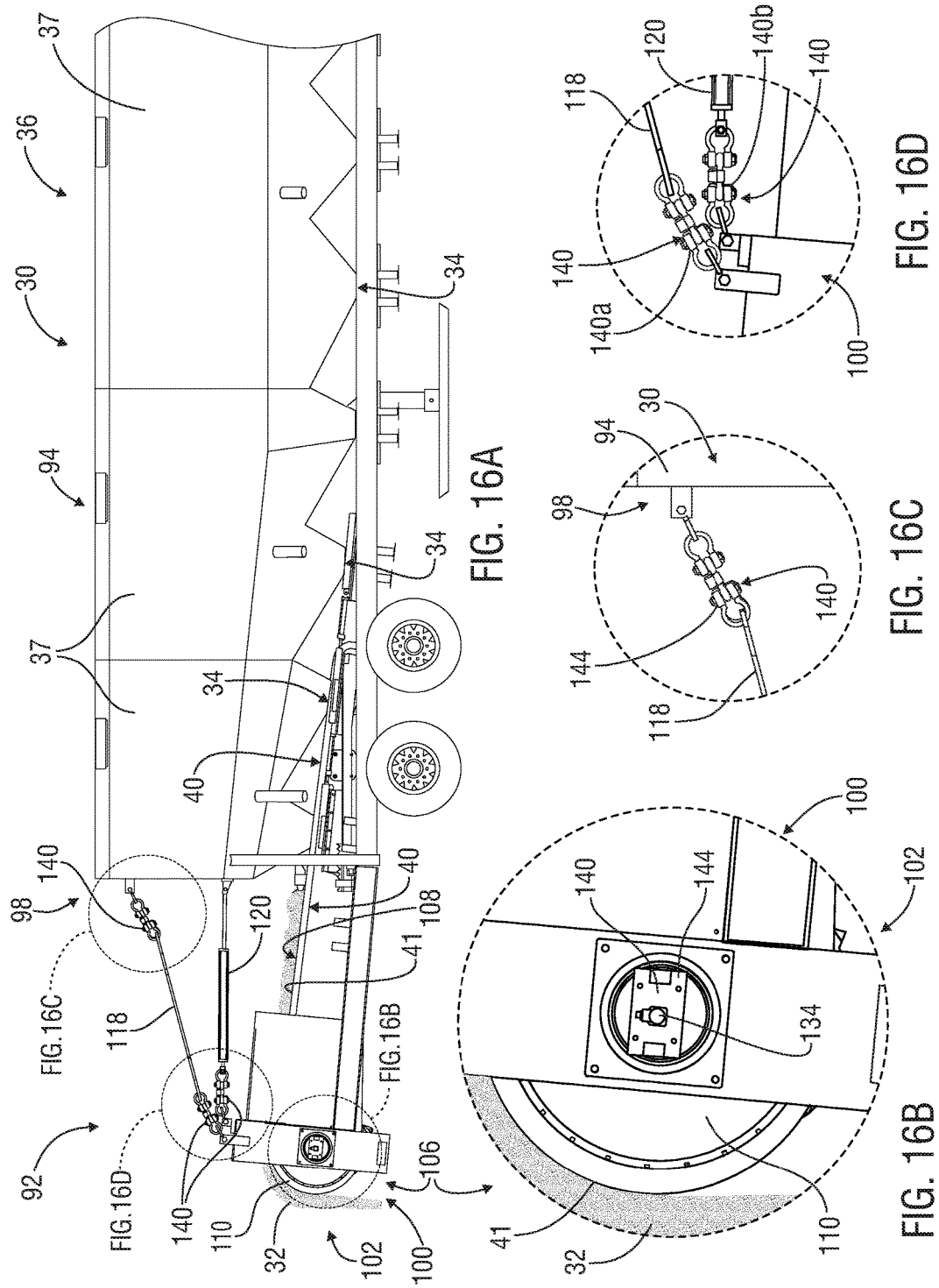

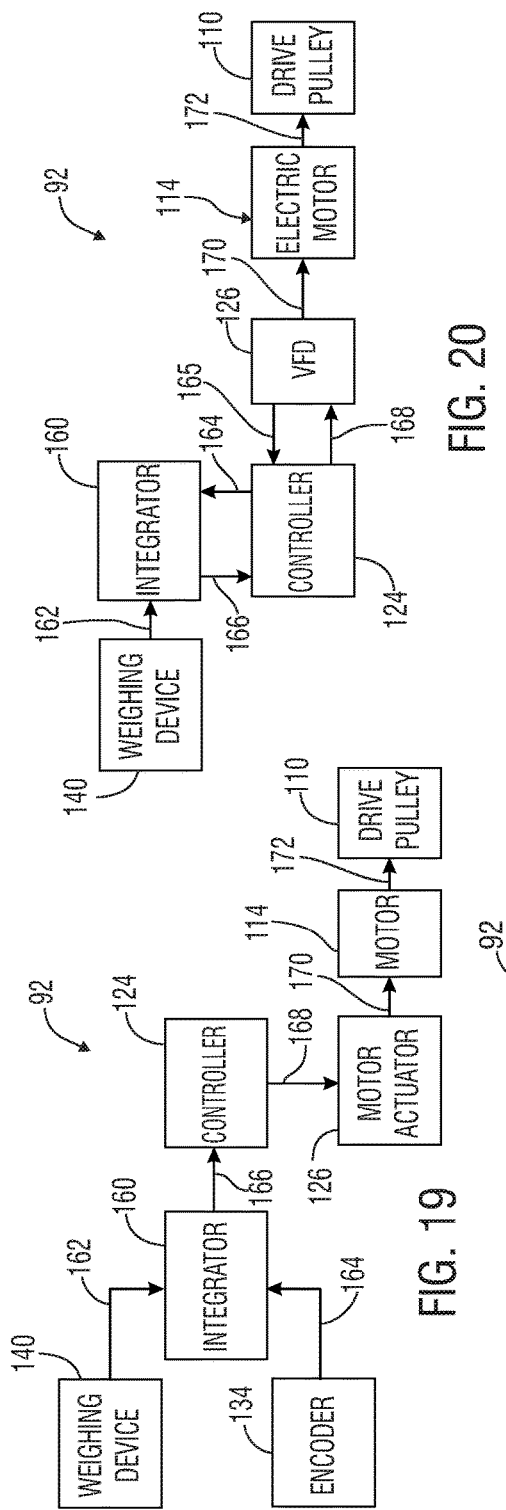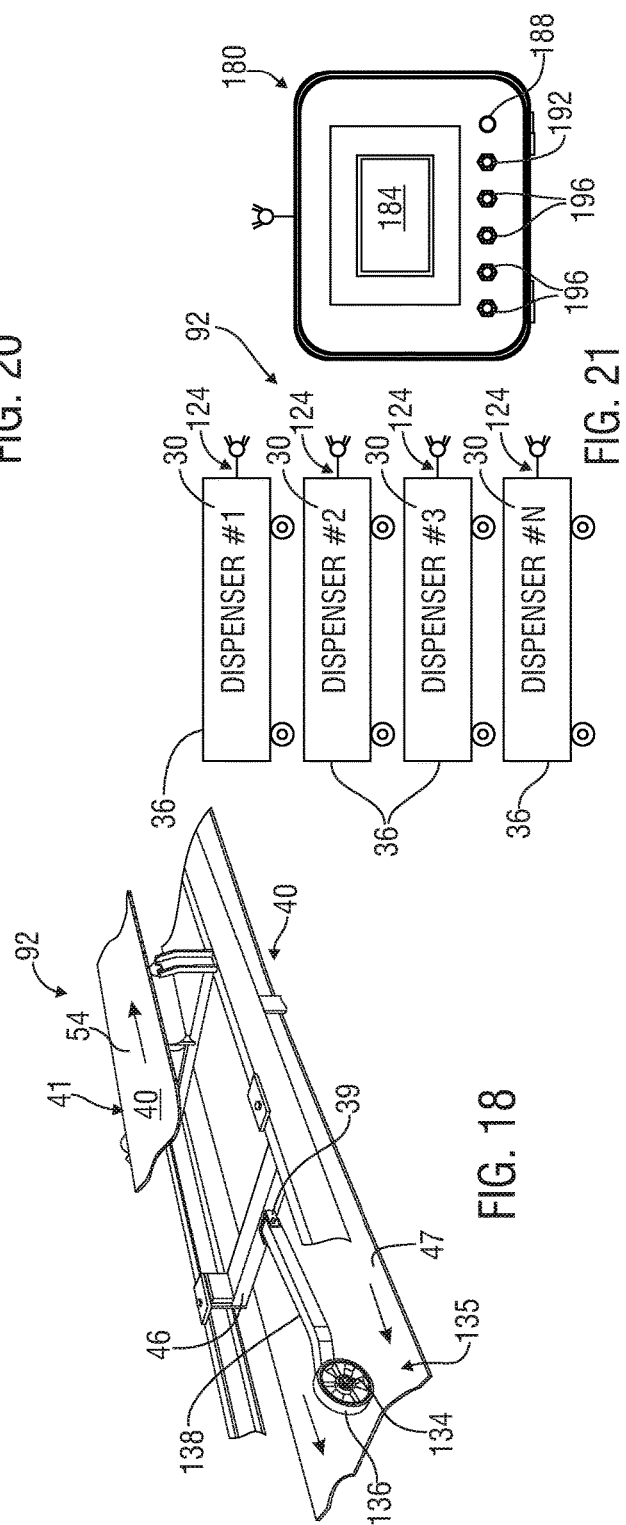

APPARATUS AND METHODS FOR ASSISTING IN VARYING THE AMOUNT OF MATERIAL DELIVERED FROM A CONVEYOR

This application is a continuation of and claims priority to U.S. patent application Ser. No. 13/740,835 filed on Jan. 14, 2013, entitled "Apparatus and Methods for Assisting in Controlling Material Discharged From a Conveyor", which is a continuation-in-part of and claims priority to U.S. patent application Ser. No. 13/568,468 filed Aug. 7, 2012, entitled "Apparatus and Methods for Assisting in Controlling the Discharge of Material Onto a Conveyor From a Dispenser" and issued as U.S. Pat. No. 9,038,865 on May 26, 2015, both of which are hereby incorporated by reference herein in their entireties.

FIELD OF THE INVENTION

The present disclosure relates generally to material delivery and conveyance technology and, more particularly, to apparatus and methods for assisting in controlling the amount or rate of delivery of material onto or off of a conveyor.

BACKGROUND OF THE INVENTION

Various industries involve systems for dispensing material, such as dry solids, onto conveying devices. In the hydrocarbon exploration and production industries, for example, materials are often dispensed from storage units onto conveyor belts for delivery to another location or system. One exemplary scenario often utilizing material storage units and conveyors is a hydraulic fracturing well site requiring the use of proppant or sand. In many frac job sites, a material storage unit, such as the Frac Sander by National Oilwell Varco, Inc, is used to dispense the sand or proppant onto a conveyor for delivery to another component, such as a blender.

Presently known systems and techniques for delivering materials via conveying devices may have one or more drawbacks. For example, as illustrated in FIG. 1, the material 32 often overflows off the sides of the conveyor 40 as it is being discharged from the dispensing unit 30. Depending upon the particular application, material overflow can freeze the conveyor belt from moving, make it difficult or impossible to determine or control the rate of discharge of material from the conveyor to the desired destination or cause other unwanted consequences.

For another example, various existing systems and techniques that attempt to determine or control the amount of material being discharged from the conveyor to the blender, or other destination, may have one or more drawbacks. Some systems attempt to determine the amount of material discharged by calculating the loss of weight of the entire material storage unit after material is dispensed onto the conveyor. Depending upon the application, such techniques may be cumbersome, inaccurate or cause other undesirable consequences. Other techniques involve running the conveyor very fast and frequently varying the open position of the discharge gates on the material dispenser, which are believed to often be inaccurate, cumbersome or cause other undesirable consequences. Yet other techniques require a first person at the equipment site to operate the gate controls and a second person, also at the equipment site near the end of the conveyor. The second person watches the discharge of material from the conveyor belt to the blender (or other destination), and signals the first person to move the discharge gates to vary the supply of material onto the conveyor. This technique may also be inaccurate, cumbersome and cause other unwanted consequences.

It should be understood that the above-described discussion is provided for illustrative purposes only and is not intended to limit the scope or subject matter of the appended claims or those of any related patent application or patent. Thus, none of the appended claims or claims of any related application or patent should be limited by the above discussion or construed to address, include or exclude each or any of the cited examples, features and/or disadvantages, merely because of the mention thereof herein.

Accordingly, there exists a need for improved systems, apparatus and methods useful to assist in controlling the amount or rate of delivery of material onto or off of a conveyor having one or more of the attributes or capabilities described or shown in, or as may be apparent from, the other portions of this patent.

BRIEF SUMMARY OF THE DISCLOSURE

In some embodiments, the present disclosure involves methods of controlling the amount of material delivered by a conveyor belt with the use of a material discharge metering system. The material is provided onto the conveyor belt from a material dispenser through at least one dispenser opening therein. The conveyor belt is moved, at least partially, by at least one drive pulley that is rotated by at least one motor. The speed of the motor affects the speed of the drive pulley and conveyor belt. The material discharge metering system includes at least one electronic controller, at least one encoder or variable frequency drive and at least one weighing device. The method includes the encoder or variable frequency drive measuring the speed of the conveyor belt and/or the drive pulley. The weighing device weighs material dispensed onto the conveyor belt from the material dispenser. The electronic controller maintains or changes the speed of the conveyor belt by dictating the output of the motor based, at least in part, upon at least one speed measurement generated by the encoder or variable frequency drive and at least one weight measurement generated by the weighing device. The amount of material delivered by the conveyor belt is at least partially controlled by controlling the speed of the conveyor belt.

In various embodiments, the present disclosure involves methods of automatically controlling the amount of material discharged off the discharge end of a conveyor belt. The material is provided onto the conveyor belt from a material dispenser through at least one dispenser opening therein. The conveyor belt is moved, at least partially, by at least one drive pulley that is rotated by at least one fluid-powered motor. Fluid is provided to the motor to drive the motor by at least one fluid control valve. The method includes at least one encoder engaged with at least one among the conveyor belt and the drive pulley measuring the speed thereof. At least one weighing device associated with the conveyor belt weighs material dispensed onto the conveyor belt from the material dispenser. At least one electronic controller maintains or changes the speed of the conveyor belt by dictating the amount of fluid provided from the valve to the motor based, at least partially, upon the actual rate of discharge of material off the discharge end of the conveyor belt calculated from readings taken by the encoder and weighing device. The amount of material discharged off the discharge end of the conveyor belt is at least partially controlled by controlling the speed of the conveyor belt.

In many embodiments, the present disclosure involves methods of controlling the amount of material delivered off the end of a conveyor belt. The material is provided onto the conveyor belt from a mobile sand conveying or storage unit at or near a hydrocarbon well drilling site. The method includes at least substantially preventing material dispensed onto the conveyor belt from the mobile sand conveying or storage unit from overflowing off the sides of the conveyor belt. The actual discharge rate of material delivered off the end of the conveyor belt is calculated and compared to a desired rate of delivery of material off the end of the conveyor belt. If the actual discharge rate is not equal to the desired delivery rate, the speed of the conveyor belt is changed. These actions are repeated on an ongoing basis.

The present disclosure includes embodiments of apparatus for controlling the amount or rate of discharge of material discharged off a conveyor belt at at least one discharge point thereon. The material is provided onto the conveyor belt from a material dispenser through at least one dispenser opening therein. The conveyor belt is moved, at least partially, by at least one drive pulley that is rotated by at least one motor. The apparatus includes at least one encoder or variable frequency drive associated with at least one among the conveyor belt and the drive pulley and configured to measure the speed thereof. At least one weighing device is associated with the conveyor belt between at least one dispenser opening of the material dispenser and the discharge point of the conveyor belt. The weighing device is configured to weigh material dispensed onto the conveyor belt from the material dispenser. At least one electronic controller is configured to vary the output of the at least one motor based, at least in part, upon data from the weighing device and at least one among the encoder and variable frequency drive. Thus, the amount or rate of discharge of material discharged off the conveyor belt is at least partially controlled by controlling the speed of the conveyor belt.

In select embodiments, the present disclosure involves apparatus for automatically controlling the amount or rate of discharge of material discharged off the discharge end of a conveyor belt. The material is provided onto the conveyor belt from a material dispenser through at least one dispenser opening therein. The conveyor belt is moved, at least partially, by at least one drive pulley that is rotated by at least one fluid-powered motor. The apparatus includes at least one fluid control valve configured to provide fluid to the motor to drive the motor. At least one encoder is engaged with at least one among the conveyor belt and the drive pulley and configured to measure the speed thereof. At least one weighing device is associated with the conveyor belt and configured to weigh material dispensed onto the conveyor belt from the material dispenser. At least one electronic controller is configured to dictate the amount of fluid provided from the valve to the motor based, at least partially, upon the actual rate of discharge of material off the discharge end of the conveyor belt calculated from readings taken by the encoder and the weighing device. Thus, the amount or rate of material discharged off the discharge end of the conveyor belt is controlled by maintaining or changing the speed of the conveyor belt.

In many embodiments, the present disclosure involves a method of controlling the amount of material discharged off a conveyor belt with the use of a material discharge metering system. The conveyor belt is moved, at least partially, by at least one rotating drive pulley. The material is provided onto the conveyor belt from a material dispenser through at least one dispenser opening therein and an associated discharge control device. The height of the material dispensed onto the conveyor is determined, at least partially, by a wiper extending downwardly from the discharge control device over the conveyor belt. The material discharge metering system includes an electronic controller configured to control the speed of the conveyor belt and an encoder engaged with the drive pulley. The method includes the electronic controller determining the expected rate of material discharge off the discharge end of the conveyor belt moving at its maximum speed in pounds per minute (PPM) in accordance with the equation $$PPM = \frac{(\text{Max } RPM)(PPR)}{PPU},$$

wherein

Max RPM is the maximum rotations per minute of the drive pulley,
PPR is the pulses per revolution of the encoder, and
PPU is $$\frac{PPR}{(VPR)(D)},$$

wherein
D is the bulk density of the material, and
VPR is (C×A), wherein
C is the circumference of the drive pulley, and
A is the planar area between the conveyor belt and the wiper.

As material is dispensed onto the conveyor belt and the drive pulley rotates to move the conveyor belt, the encoder measures the speed of rotation of the drive pulley. The electronic controller maintains or changes the speed of the conveyor belt based, at least in part, upon readings taken by the encoder, so that the amount of material discharged off the conveyor belt is at least partially controlled by controlling the speed of the conveyor belt.

The present disclosure also includes embodiments of a method of controlling the amount of material discharged off a conveyor belt with the use of a material discharge metering system. The conveyor belt is moved, at least partially, by at least one rotating drive pulley. The material is provided onto the conveyor belt from a material dispenser through at least one dispenser opening therein and an associated discharge control device. The height of the material dispensed onto the conveyor is determined, at least partially, by a wiper extending downwardly from the discharge control device over the conveyor belt. The material discharge metering system includes an electronic controller configured to control the speed of the conveyor belt and an encoder engaged with the drive pulley. The method includes the electronic controller determining the expected rate of material discharge off the discharge end of the conveyor belt moving at its maximum speed in pounds per minute (PPM) in accordance with the equation $$PPM = (VPM)(D), \text{ wherein}$$

D is the bulk density of the material, and
VPM=(Max RPM)(VPR), wherein
Max RPM is the maximum rotations per minute of the drive pulley,
VPR is (C×A), wherein
C is the circumference of the drive pulley, and A is the planar area between the conveyor belt and the wiper.

As material is dispensed onto the conveyor belt and the drive pulley rotates to move the conveyor belt, the encoder measuring the speed of rotation of the drive pulley. The electronic controller maintains or changes the speed of the conveyor belt based, at least in part, upon readings taken by the encoder, so that the amount of material discharged off the conveyor belt is at least partially controlled by controlling the speed of the conveyor belt.

In some embodiments, the present disclosure involves a method of controlling the supply of material onto a conveyor belt from a material dispenser. The material dispenser includes multiple material storage compartments, each having at least two dispenser openings associated therewith and at least one dispenser gate movable over each dispenser opening between at least one flow-open position and a flow-closed position. The dispenser openings are disposed over the conveyor belt. The method includes fully opening all the dispenser gates of a first material storage compartment to allow material therein to be dispensed onto the conveyor belt, determining when the first material storage compartment is empty and closing all the dispenser gates of that first material storage compartment. All the dispenser gates of a second material storage compartment are fully opened and the process is repeated for them.

In various embodiments, the present disclosure involves a method of automatically controlling the supply of material onto a conveyor belt from a material dispenser. The material dispenser includes multiple material storage compartments, each having at least one dispenser opening associated therewith and at least one dispenser gate movable over each dispenser opening between at least one flow-open position and a flow-closed position. The dispenser openings are disposed over the conveyor belt. The method includes associating at least one sensor with each material storage compartment. An electronic controller communicates with each dispenser gate and sensor. Each sensor notifies the electronic controller when its associated material storage compartment is empty of material. The electronic controller directs the movement of one or more of the dispenser gates between positions based, at least partially, upon the presence or absence of material in one or more material storage compartments.

There are also embodiments of the present disclosure that involve apparatus useful for assisting in controlling the discharge of material onto a conveyor belt from a material dispenser. The material dispenser includes at least one dispenser opening through which the material is discharged. The apparatus includes a carrier associated with the material dispenser. The carrier has left and right side rails and at least a first carrier opening formed therebetween. The carrier in at least a first position is disposed below the material dispenser so that the first carrier opening is aligned at least partially below the dispenser opening of the material dispenser to allow material to flow from the material dispenser, through the first carrier opening and onto the conveyor belt. The carrier includes at least one wiper extending downwardly between the left and right side rails and at least partially over the width of the conveyor belt. The wiper is configured to establish the height of material dispensed on the conveyor belt when the carrier is in the first position and as the conveyor belt moves relative to the material dispenser. The wiper includes at least one elongated wiper base and at least one elongated wiper extension. The wiper base is rigidly secured to the left and right side rails and the wiper extension is adjustably secured to the wiper base. The vertical position of the wiper extension relative to the wiper base may be adjusted to establish the height of material dispensed on the conveyor belt from the material dispenser when the carrier is in the first position and as the conveyor belt moves relative to the material dispenser. The height of the material dispensed on the conveyor belt may thus be selectively adjusted by adjusting the position of the wiper extension relative to the wiper base.

Accordingly, the present disclosure includes features and advantages which are believed to enable it to advance material delivery technology. Characteristics and advantages of the present disclosure described above and additional features and benefits will be readily apparent to those skilled in the art upon consideration of the following detailed description of various embodiments and referring to the accompanying drawings.

BRIEF DESCRIPTION OF THE DRAWINGS

The following figures are part of the present specification, included to demonstrate certain aspects of various embodiments of this disclosure and referenced in the detailed description herein:

FIG. 2 is a perspective view of an embodiment of a discharge control device in accordance with the present disclosure shown in a flow-open position relative to an exemplary material dispenser;

FIG. 3 is a rear view in partial cross-section of the exemplary discharge control device of FIG. 2 shown engaged with a material dispenser that is dispensing material onto a conveyor;

FIG. 4 is a perspective view of the exemplary discharge control device of FIG. 2;

FIG. 5 is a side view in partial cross-section of the exemplary discharge control device of FIG. 2 shown engaged with a material dispenser that is dispensing material onto a conveyor;

FIG. 6 is a side view of the exemplary discharge control device of FIG. 2;

FIG. 7 is a bottom view of the exemplary discharge control device of FIG. 2;

FIG. 8 is a perspective view of another embodiment of a discharge control device in accordance with the present disclosure;

FIG. 9 is a front view of the discharge control device of FIG. 8;

FIG. 10 is a cross-sectional view of the discharge control device of FIG. 8 taken along lines 10-10;

FIG. 11 is a side view in partial cross-section of the exemplary discharge control device of FIG. 8 shown engaged with a material dispenser that is dispensing material onto a conveyor;

FIG. 12 is a perspective view of the discharge control device of FIG. 8 showing the exemplary wiper extension in a different position;

FIG. 13 is a rear view in partial cross-section of a material dispenser that is dispensing material onto a conveyor with the dispenser opening positioned below the side walls of the conveyor;

FIG. 14A is a partial side view of an exemplary material dispenser having an embodiment of a material discharge metering system associated therewith in accordance with the present disclosure;

FIG. 14B is an exploded view of a portion of the material dispenser and material discharge metering system of FIG. 14A;

FIG. 14C is an exploded view of another portion of the material dispenser and material discharge metering system of FIG. 14A;

FIG. 15 is a partial perspective view of the material dispenser and exemplary discharge control device shown in FIG. 11;

FIG. 16A is a partial side view of the other side of the exemplary material dispenser and material discharge metering system of FIG. 14A;

FIG. 16B is an exploded view of a portion of the material dispenser and material discharge metering system of FIG. 16A;

FIG. 16C is an exploded view of another portion of the material dispenser and material discharge metering system of FIG. 16A;

FIG. 16D is an exploded view of another portion of the material dispenser and material discharge metering system of FIG. 16A;

FIG. 17A is a partial perspective view of an exemplary material dispenser having another embodiment of a material discharge metering system associated therewith in accordance with the present disclosure;

FIG. 17B is an exploded view of a portion of the material dispenser and material discharge metering system of FIG. 18A;

FIG. 18 is a perspective view of an exemplary floating wheel assembly that can be used with a material discharge metering system in accordance with an embodiment of the present disclosure;

FIG. 19 is a flow diagram illustrating the process performed by an embodiment of a material discharge metering system in accordance with the present disclosure;

FIG. 20 is a flow diagram illustrating the process performed by another embodiment of a material discharge metering system in accordance with the present disclosure;

FIG. 21 is a system diagram including an embodiment of a material discharge metering system used with multiple material dispensers and having an exemplary remote control device.

DETAILED DESCRIPTION OF PREFERRED EMBODIMENTS

Figure 1:
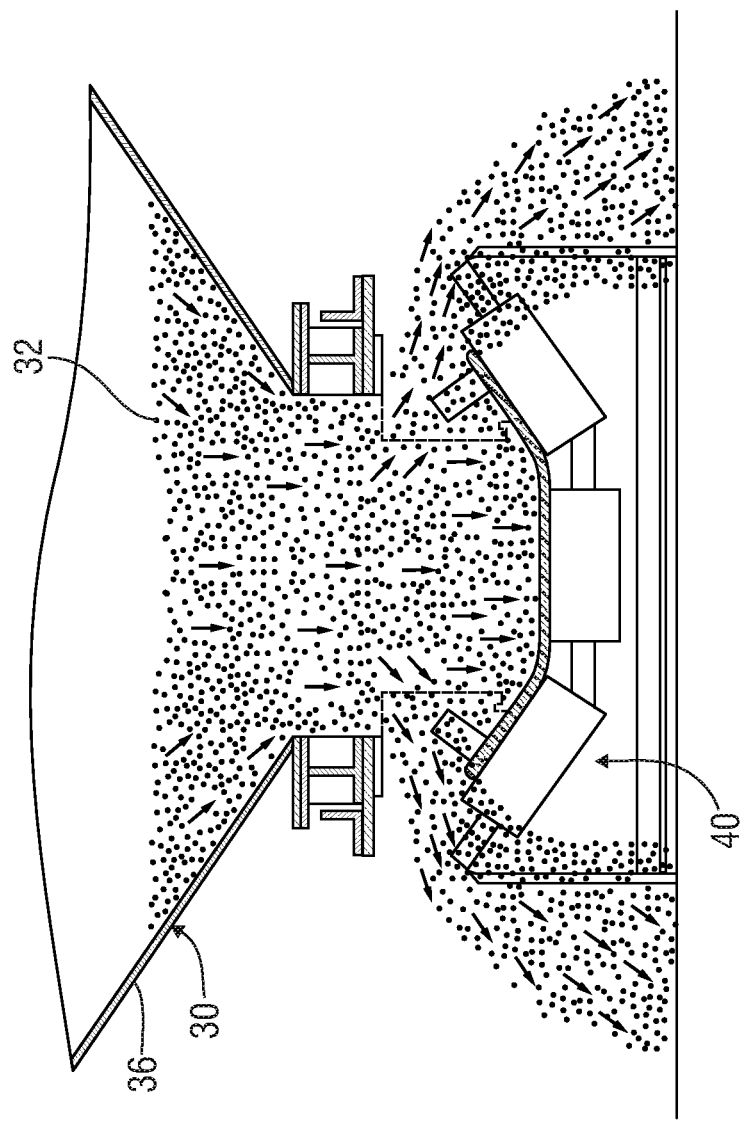
FIG. 1 is a rear view in partial cross-section of a prior art material dispenser shown dispensing material onto a conveyor.

Characteristics and advantages of the present disclosure and additional features and benefits will be readily apparent to those skilled in the art upon consideration of the following detailed description of exemplary embodiments of the present disclosure and referring to the accompanying figures. It should be understood that the description herein and appended drawings, being of example embodiments, are not intended to limit the claims of this patent or any patent or patent application claiming priority hereto. On the contrary, the intention is to cover all modifications, equivalents and alternatives falling within the spirit and scope of the claims. Many changes may be made to the particular embodiments and details disclosed herein without departing from such spirit and scope.

In showing and describing preferred embodiments in the appended figures, common or similar elements are referenced with like or identical reference numerals or are apparent from the figures and/or the description herein. The figures are not necessarily to scale and certain features and certain views of the figures may be shown exaggerated in scale or in schematic in the interest of clarity and conciseness.

As used herein and throughout various portions (and headings) of this patent application, the terms "invention", "present invention" and variations thereof are not intended to mean every possible embodiment encompassed by this disclosure or any particular claim(s). Thus, the subject matter of each such reference should not be considered as necessary for, or part of, every embodiment hereof or of any particular claim(s) merely because of such reference. The terms "coupled", "connected", "engaged" and the like, and variations thereof, as used herein and in the appended claims are intended to mean either an indirect or direct connection or engagement. Thus, if a first device couples to a second device, that connection may be through a direct connection, or through an indirect connection via other devices and connections.

Certain terms are used herein and in the appended claims to refer to particular components. As one skilled in the art will appreciate, different persons may refer to a component by different names. This document does not intend to distinguish between components that differ in name but not function. Also, the terms "including" and "comprising" are used herein and in the appended claims in an open-ended fashion, and thus should be interpreted to mean "including, but not limited to . . . ." Further, reference herein and in the appended claims to components and aspects in a singular tense does not necessarily limit the present disclosure or appended claims to only one such component or aspect, but should be interpreted generally to mean one or more, as may be suitable and desirable in each particular instance.

Referring to FIG. 2, in accordance with an embodiment of the present disclosure, a discharge control device 10 is shown. In this example, the discharge control device 10 includes a carrier 14, first and second side restrictors 20, 24 and at least one wiper 28. The illustrated carrier 14 is associated with a material dispenser 30, which is used to dispense material 32 (FIG. 3) onto one or more conveyors 40 (FIG. 3). The exemplary carrier 14 is configured to be positioned below at least one dispenser opening 34 of the material dispenser 30 and above the conveyor 40 (FIG. 3), and includes at least one carrier opening 16 alignable below the dispenser opening(s) 34.

The material 32 may be any type of solids, or solid-liquid combination that can be discharged onto a conveyor 40. Some examples of materials 32 are dry solids, sand, proppant and dry additives, such as soy gum. The material dispenser 30 may be any type of device or system that can be used to dispense material 32 onto a conveyor 40. An example material dispenser 30 is a mobile sand conveying or storage unit 36 used in the oilfield industry, such as the Sand King or Frac Master by National Oilwell Varco, used on-site at drilling locations. For example, the mobile sand conveying unit 36 may be used to deliver proppant or sand to the well site. Typically, the mobile sand conveying unit 36 dispenses the proppant onto a moving conveyor belt for delivery to another component, such as a blender. A typical sand conveying unit 36 includes one or more hoppers having multiple material storage compartments 37 and multiple dispenser openings 34 associated therewith. A hydraulically-driven steel plate, or gate, 38 is laterally movable below each dispenser opening 34 to allow the discharge of material 32 therethrough. For example, the sand conveying or storage unit 36 may have four distinct compartments 37, three compartments with two dispenser openings 34 and associated gates 38 each and a fourth compartment with three dispenser openings 34 and associated gates 38. Some other examples of material dispensers 30 are horizontal and vertical sand silos, hopper systems or other equipment useful for discharging material onto one or more conveyor 40, and may be non-mobile or mounted on trailers or vehicles, stimulation vessels or other off-shore equipment.

Likewise, the conveyor 40 may be any type of device or system that receives material 32 and delivers it to another location. For example, as shown in FIG. 3, the conveyor 40 may be a conventional conveyor belt system, typically including a belt 41 having a conveying surface 42 and side walls 45, multiple idler rollers 43 and a framework 44. However, the present disclosure and appended claims are not limited by the type, form, configuration, operation or other details of the material 32, material dispenser 30 or conveyor 40.

Referring now to FIG. 4, the illustrated side restrictors 20, 24 extend downwardly from the carrier 14 and longitudinally at least partially along opposing respective sides 14a, 14b thereof. As shown in FIG. 3, the illustrated side restrictors 20, 24 are capable of preventing material 32 from substantially overflowing off the corresponding respective sides 40a, 40b of the conveyor 40 as the material 32 is being dispensed thereon from the material dispenser 30. Referring back to FIG. 4, if included, the exemplary wiper 28 extends downwardly from the carrier 14 and perpendicular or transverse to the side restrictors 20, 24 at the front end 16a of the carrier opening 16. As shown in FIG. 5, the wiper 28 is capable of generally leveling the height H of the material 32 being dispensed onto the conveyor 40.

Still referring to FIG. 4, the carrier 14 may have any suitable form, configuration and operation. For example, the carrier 14 may include left and right side rails 48, 50 connected together with at least one cross bar 52 and engageable with the first and second side restrictors 20, 24 and wiper(s) 28 (see also FIG. 6). In the illustrated embodiment, the side rails 48, 50 each include an elongated angle iron 56 and corresponding elongated metal plate 60, which are bolted, or otherwise fastened, together over the proximal, or top, end of the corresponding side restrictor 20 or 24. The illustrated cross bar 52 and wiper 28 are connected with the side rails 48, 50, such as by weld, and the space between them forms the carrier opening 16. In other embodiments, more than one cross bar 52 and/or wiper 28 may be included and may form more than one carrier opening 16.

The carrier 14 may be associated with the material dispenser 30 in any suitable manner. Referring back to FIG. 2, in this embodiment, the carrier 14 is associated with the material dispenser 30 by being connected to and movable with the gate 38. For example, the upper surface 57 (FIG. 4) of the rear section 58 of each angle iron 56 may be mounted flush against the bottom 39 of the gate 38, such as by weld or other connection method. The remainder of the exemplary carrier 14 extends forward of the front 38a of the gate 38. The illustrated carrier 14 thus slides between positions along with movement of the gate 38. In this arrangement, as the gate 38 is moved rearward (arrow 74) relative to the dispenser opening 34, the carrier opening 16 becomes aligned under the dispenser opening 34.

Still referring to FIG. 2, if desired, a gap filler 64 may be included to fill all, or part of, the gap 62 that would exist between each side rail 48, 50 and the bottom surface(s) 31 of the material dispenser 30 adjacent to the dispenser opening 34 and forward of the gate 38. This may be useful, for example, to prevent the leakage or escape of material 32 through the gap 62. For example, a gap filler 64 may be provided on the front section 59 (FIG. 4) of each angle iron 56. The gap filler 64 may have any suitable form and configuration. In this embodiment, as shown in FIG. 4, each gap filler 64 is a flat bar 66 welded to the top surface of the front section 59 of each angle iron 56 and has a thickness T approximately equal to the thickness of the gate 38 (see FIG. 6). The illustrated flat bars 66 lie flush against the bottom surface 31 of the dispenser 30 adjacent to the dispenser opening 34. In other embodiments, for example, the gap filler 64 may instead be an integral part of the side rails 48, 50.

The side restrictors 20, 24 may have any suitable form, configuration and operation. In this embodiment, the side restrictors 20, 24 are positioned and sized so that, during use, they extend to, and contact, the conveying surface 42 (FIG. 3) of the conveyor 40 at a desired location on the width thereof. Depending upon the particular application, the side restrictors 20, 24 may be useful to prevent material 32 from overflowing off the respective sides of the conveyor 40 as the material 32 is being dispensed thereon, assist in preventing wind or other external influences from disturbing the desired discharge and distribution of material 32 onto the conveyor 40, help establish a uniform volume of material 32 being discharged onto the conveyor 40, one or more other purpose, or a combination thereof.

The exemplary side restrictors 20, 24 are constructed of flexible material (e.g. elastomeric material), such as to prevent damage to the conveyor 40 due to contact therewith. In other embodiments, only a portion of the side restrictors 20, 24, such as the lower ends 22, 26 (FIG. 4), respectively, may be constructed of flexible material. In yet other embodiments, the side restrictors 20, 24 may not be configured to extend all the way to the conveying surface 42 of the conveyor 40 and may not be constructed of flexible material. For example, the side restrictors 20, 24 may be constructed of steel or any other desired material. Thus, the side restrictors 20, 24 may be designed to extend to any desired height over the conveyor 40. Likewise, the side restrictors 20, 24 may be designed to be positioned, during use, at any desired locations relative to the width of the conveyor 40. For example, in some applications, it may be desirable to retain the material 32 within a narrow width section on the conveying surface 42 of the conveyor 40. In some embodiments, the carrier 14 may be configured so that the position of one or both side restrictors 20, 24 is adjustable, such as to be able to adjust the position of the side restrictors 20, 24 relative to the conveyor 40.

The wiper 28 may likewise have any suitable form, configuration and operation. In this embodiment, the wiper 28 is a steel plate having (i) a length that substantially corresponds with the width section of the conveyor 40 upon which the material 32 will be dispensed, and (ii) a width W (FIG. 6) so that it extends down from the carrier 14 to a desired height H (FIG. 5) over the conveyor 40. The illustrated wiper 28 is configured so that, during operation, it will level off the top of the material 32 after it is dispensed from the material dispenser 30 and as the conveyor 40 moves in the direction of arrow 70. The exemplary wiper 28 is thus configured to establish a maximum height H of the material 32 on the conveying surface 42 of the conveyor 40. Depending upon the particular application, the wiper 28 may be useful to help establish a uniform volume of material 32 being discharged onto the conveyor 40, assist in preventing material overflow from the conveyor 40, one or more other purpose, or a combination thereof. For some types of materials 32, as the conveyor 40 continues to move in the direction of arrow 70, the material 32 may remain at height H based upon the self-bridging principal of sand.

In some embodiments, the carrier 14 may be configured so that the position of the wiper 28 is adjustable, such as to allow selection of the profile or height of the material 32 on the conveyor 40, to select or change the volume of output onto the conveyor 40, assist in preventing spillage of material 32 from the conveyor or other desired purpose. In the embodiment of FIG. 8, for example, the wiper 28 includes a wiper base 80 and an adjustable wiper extension 82 that extends downwardly from the wiper base 80 to allow selective adjustment of the height H (FIG. 11) of the wiper 28 over the conveyor 40 and, consequently, the height H of the material 32 on the conveying surface 42.

The wiper base 80 and extension 82 may have any suitable form, configuration and operation. In the embodiment of FIG. 8, the wiper base 80 and extension 82 are each steel plates that extend downwardly from the carrier 14 and perpendicular or transverse to the side restrictors 20, 24 at the front end 16*a* of the carrier opening 16. The exemplary wiper base 80 is connected with the side rails 48, 50, such as by weld. The illustrated extension 82 is movable up and down relative to the base 80.

Referring to FIG. 9, the illustrated wiper extension 82 is aligned over the front 80*a* of the wiper base 80, but may instead be aligned over the back of the wiper base 80. The length L of the exemplary extension 82 is the same as the length of the wiper base 80, but could instead be formed with a different length, or have different portions with differing lengths. The illustrated extension 82 may have any desired width W2.

In this embodiment, the wiper base 80 and extension 82 are releasably connected together with one or more connectors 86, each movable between fully engaged and non-fully engaged positions. Each exemplary connector 86 extends through an elongated slot 88 formed in the wiper extension 82 and an anchor hole 90 (FIG. 10) formed in the wiper base 80. Any suitable connector(s) 86 may be used. In this example, the connectors 86 are bolts. When fully engaged, the illustrated connectors 86 secure the position of the extension 82 relative to the wiper base 80 for operation of the discharge control device 10. When in a non-fully engaged position, the connectors 86 allow the extension 82 to be moved up and down relative to the wiper base 80 within the range of travel of the connector(s) 86 in the slot(s) 88.

Referring to FIG. 11, in this embodiment, the extension 82 will level off the top of the material 32 after it is dispensed from the material dispenser 30 and as the conveyor belt 41 moves in the direction of arrow 70. The exemplary wiper extension 82 thus serves to establish the maximum height H of the material 32 on the conveying surface 42 of the conveyor 40. The repositioning of the exemplary extension 82 relative to the base 80 allows adjustment of the height H of the wiper 28 relative to the conveyor 40. For example, the height H of the wiper 28 may be adjusted to the desired height when setting up the discharge control device 10 for operation. In FIGS. 8-11, for example, the extension 82 is in its lowermost position relative to the wiper base 80, establishing the shortest height H of the wiper 28 over the conveyor 40 and the shortest height H of the material 32 on the conveyor 40. In contrast, in FIG. 12, the exemplary extension 82 is secured in a higher position relative to the wiper base 80, which will position the wiper 28 higher over the conveyor (not shown) and allow material 32 to form on the conveyor 40 at a greater height. The adjustability of the illustrated extension 82 thus allows selection of the profile or height of the material 32 on the conveyor 40, such as to change the volume of output onto the conveyor 40, prevent spillage of material 32 from the conveyor or other desired purpose.

An example operation of the discharge control device 10 of FIG. 2 will now be described. Referring to FIG. 7, the gate 38 of the material dispenser 30 is opened, causing the exemplary carrier 14 to be moved into position between the dispenser opening 34 and conveyor 40 (FIG. 5). As shown in FIG. 5, material 32 is then discharged from the material dispenser 30 through the opening 34 and through the carrier opening 16. As the material 32 passes through the carrier opening 16 and onto the conveying surface 42 of the conveyor belt 41, the illustrated side restrictors 20, 24 prevent at least substantial overflow of material off the sides 40*a*, 40*b* (FIG. 3) of the conveyor 40. If included, the gap fillers 64 prevent leakage of material 32 through the gap 62 (FIG. 2). As desired, the conveyor belt 41 is moved in the direction of arrow 70. Concurrently with the movement of the conveyor belt 41, the wiper 28 levels off the top of the material on the conveying surface 42 at height H. Since material provided onto the conveyor 40 is at least substantially retained on the conveyor belt 41 with the use of the exemplary carrier 14, the amount of material 32 retained on the conveyor 40 may be at least substantially known. If desired, the gate 38 of the material dispenser 30 may be moved to a fully open position and the dispenser opening 34 retained in a fully open state.

There may be other applications in which material 32 provided onto the conveyor 40 may be at least substantially retained on the conveyor 40 without the use of the discharge control device 10. For example, in the embodiment of FIG. 13, the dispenser opening 34 of the material dispenser 30 is shown positioned in close proximity to the conveyor belt 41. In this example, the side walls 45 of the conveyor 40 extend upwardly above the height of the dispenser opening 34, helping prevent (at least substantial) overflow of material off the sides 40*a*, 40*b* of the conveyor 40. In such instances, the amount of material 32 retained on the conveyor 40 may be at least substantially known.

Referring now to FIG. 14A, in another independent aspect of the present disclosure, when the amount of material 32 retained on the conveyor 40 is least substantially known (with or without the use of the discharge control devices 10 of FIGS. 2-12), the quantity and/or rate of material 32 being discharged off, or delivered by, the conveyor 40 may, if desired, be measured and/or controlled. In some embodiments, controlling the quantity or rate of material 32 discharged off, or delivered by, the conveyor 40 may be accomplished by controlling and, if necessary, varying the speed of the conveyor 40, the rate the material 32 is dispensed from the material dispenser 30 onto the conveyor 40, any other suitable manner or a combination thereof. Controlling the discharge rate or volume of material 32 off the conveyor 40 may be useful, for example, to improve the efficiency and effectiveness of the overall material delivery operation, optimize or improve equipment performance or other reasons. In many applications, for example, the conveyor 40 may be moved slowly and often returned to a stop, while efficiently delivering the desired volume of material 32.

In the embodiment of FIG. 14A, the material dispenser 30 is a mobile sand conveying unit 36. However, any other type of material dispenser 30 may be used. The illustrated material dispenser 30 is shown having a main body 94 that includes multiple material storage compartments 37 and associated dispenser openings 34 aligned along a longitudinal axis 94a of the main body 94 between its front and rear ends 96, 98. The dispenser openings 34 are aligned over the conveyor 40 so that material 32 may be dispensed from each compartment 37 onto the conveyor belt 41. An elongated stinger 100, at least one cable 118 and at least one stinger lifting arm 120 are shown extending from the rear end 98 of the main body 94. The cable 118 may, for example, be a safety cable and the lifting arm 120, when included, may be a hydraulic RAM used to raise and lower the stinger 100. It should be noted that some dispensers 30 may have more than one or no cables 118 or lifting arms 120.

The illustrated stinger 100 is pivotably moveable about at least one hinge 104 (FIG. 14B) relative to the main body 94 between at least one retracted position (not shown) and at least one extended position (shown). As shown in FIG. 14C, the exemplary conveyor belt 41 extends over the illustrated stinger 100 to its discharge end 106, which is located at the far end 102 of the stinger 100. At its discharge end 106, the illustrated belt 41 wraps around at least one discharge drum, or drive pulley 110. The exemplary drive pulley 110 drives the movement of the conveyor belt 41. Thus, the speed of movement the conveyor belt 41 is directly affected by the speed of rotation of the drive pulley 110. In this embodiment, at least one motor 114 drives the pulley 110. The aforementioned components of the material dispenser 30 of FIGS. 14A-C and further details of their form, configuration and operation are known in the art. Moreover, the present disclosure is not limited to use with the exemplary material dispenser 30 of FIGS. 14A-C and may be used with any other type of material dispenser 30 having some or all of the same or similar components as described above, or different components.

Referring still to FIGS. 14A-C, in accordance with various embodiments of the present disclosure, a material discharge metering system 92 includes an electronic controller 124 (FIG. 14B) configured to assist in measuring and/or controlling the amount of material 32 discharged off the end 106 of the conveyor belt 41. The electronic controller 124 may have any suitable form, configuration and operation. For example, the controller 124 may be a programmable logic controller (PLC), as is and become known.

It should be noted that while the present disclosure discusses the discharge of material 32 off the discharge end 106 of the conveyor belt 41, the material discharge metering system 92 is not so limited. The system 92 and all the features and methods herein may also be used when the material 32 is delivered by the conveyor 40 in any other manner. For example, the present disclosure is not limited to situations where the material 32 is discharged off the end 106 of the conveyor belt 41, but may instead by discharged off another part of the conveyor belt 41, removed from the conveyor belt 41 (and thus not necessarily discharged off the belt 41) or otherwise delivered by the conveyor belt 41. As used herein, the terms "end", "discharge end" and "discharge point" of the conveyor belt, as well as variations thereof, mean the end 106 of the conveyor belt 41 and any other locations of, or areas on, the conveyor belt 41 from which material 32 is discharged, removed or otherwise delivered.

Referring now to FIGS. 16A-D, the exemplary material discharge metering system 92 may be configured to determine the actual rate of discharge (or amount) of material 32 off the discharge end 106 of the conveyor belt 41 (the "Actual Discharge Rate"). The "Actual Discharge Rate" also encompasses the actual rate of discharge of material 32 off any other part of the conveyor belt 41, as well as the actual rate of delivery of material 32 by the conveyor belt 41. Any suitable technique may be used to determine the Actual Discharge Rate. In the embodiment of FIGS. 16A-B, for example, at least one encoder 134 is included. The encoder(s) 134 may have any suitable form, configuration, operation and location. In this example, the encoder 134 is located at the axle point of the drive pulley 110 (FIG. 16B) and configured to measure its speed of rotation in rotations per minute (RPM) and provide readings to the controller 124 and/or one or more other components. One example of a presently commercially available encoder 134 that may be used in the material discharge metering system 92 is the ES20 sold by BEI ENCODERS under model number ES200234-600.

If desired, the Actual Discharge Rate may be calculated or estimated by the controller 124 or other suitable component using any suitable formulae. In one example of a material discharge metering system 92 (e.g. FIGS. 16A-D) used with a material dispenser 30 having a discharge control device 10 (e.g. FIG. 15), the Actual Discharge Rate may be calculated in pounds per minute (PPM) with the formula:

$$PPM = \frac{(\text{Max } RPM)(PPR)}{PPU},$$

Max RPM=maximum rotations per minute of drive pulley 110
PPR=pulses per revolution of encoder 134

$$PPU = \text{pulses per unit} = \frac{PPR}{(VPR)(D)}$$

VPR=volume per revolution=(C×A)
C=circumference of drive pulley 110=2Πr
A=planar area between conveyor belt 41 and wiper 28 (FIG. 15)
D=bulk density of material For example, if the diameter of the drive pulley is 18 inches, its circumference C is 56.54 inches, or 4.71 Ft. The planar area A (FIG. 15) between the exemplary conveyor belt 41 and wiper 28, may be calculated using computer modeling, as is and becomes known. If A=0.6 Ft², then VPR is $$(4.71 \text{ Ft})(.6 \text{ Ft}^2) = \left(2.827 \frac{\text{Ft}^3}{\text{REV}}\right).$$

If the encoder 134 produces 600 pulses per revolution (PPR) and the bulk density D of the material 32 is 100 pounds per cubic foot, then:

$$PPU = \frac{\left(600 \frac{\text{PULSE}}{\text{REV}}\right)}{\left(2.827 \frac{\text{Ft}^3}{\text{REV}}\right)\left(100 \frac{\text{LBS}}{\text{Ft}^3}\right)} = \frac{\left(600 \frac{\text{PULSE}}{\text{REV}}\right)}{\left(282.7 \frac{\text{Ft}^3}{\text{REV}}\right)} = \left(2.122 \frac{\text{PULSE}}{\text{LBS}}\right)$$

If the maximum speed of the drive pulley 110 (e.g. obtained with a tachometer) (Max RPM) is 141 RPM, the Max RPM and PPU values can be input into the controller 124 (or other component) to determine the amount of material 32 discharged off the conveyor 40 (at max speed) in pounds per minute:

$$PPM = \frac{\left(141 \frac{REV}{MIN}\right)\left(600 \frac{PULSE}{REV}\right)}{\left(2.122 \frac{PULSE}{LBS}\right)} = 39,868.04 \frac{LBS}{MIN}$$

In another example, If $$A = .467 \text{ Ft}^2, \text{ then } VPR = (4.71 \text{ Ft})(.467 \text{ Ft}^2) = \left(2.2 \frac{\text{Ft}^3}{REV}\right)$$

and the following results will follow:

$$PPU = \frac{\left(600 \frac{PULSE}{REV}\right)}{\left(2.2 \frac{\text{Ft}^3}{REV}\right)\left(100 \frac{LBS}{\text{Ft}^3}\right)} = \frac{\left(600 \frac{PULSE}{REV}\right)}{\left(200 \frac{\text{Ft}^3}{REV}\right)} = \left(2.73 \frac{PULSE}{LBS}\right)$$

$$PPM = \frac{\left(141 \frac{REV}{MIN}\right)\left(600 \frac{PULSE}{REV}\right)}{\left(2.73 \frac{PULSE}{LBS}\right)} = 30,989 \frac{LBS}{MIN}$$

The Actual Discharge Rate in pounds per minute (PPM) may also be estimated based upon the volume per minute (VPM) of material 32 discharged off the end 106 of the conveyor belt 41 with the formulae:

VPM=(Max RPM)(VPR)

PPM=(VPM)(D)

Using the data plugged into the second example above, the estimated amount of material 32 discharged off the conveyor 40 (at max speed) in pounds per minute would be:

$$VPM = \left(141 \frac{REV}{MIN}\right)\left(2.2 \frac{\text{Ft}^3}{REV}\right) = 310.139 \frac{\text{Ft}^3}{MIN}$$

$$PPM = \left(310.139 \frac{\text{Ft}^3}{MIN}\right)\left(100 \frac{LBS}{\text{Ft}^3}\right) = 31,013.9 \frac{LBS}{MIN}$$

Knowing the Actual Discharge Rate based upon the type (bulk density) of material 32 discharged off the conveyor 40 (such as into a blender or other destination), can be used to improve overall material delivery planning, efficient supply of material 32 into the material storage compartments 37 of the material dispenser 30, or any other purpose. If desired, one or more variables may be changed to modify the Actual Discharge Rate. For example, if the discharge control device 10 includes an adjustable wiper extension 82 (e.g. FIGS. 8-12), the position of the extension 82 may be adjusted to vary the planar area A, changing the Actual Discharge Rate. For another example, the speed of the drive pulley 110 may be changed.

In other embodiments, such as shown in FIG. 18, the encoder 134(s) may be configured to more directly measure the speed of the conveyor belt 41. In this example, the encoder 134 is part of a floating wheel assembly 135 associated with the conveyor belt 41 and useful to measure the speed of the belt 41. The floating wheel assembly 135 may have any suitable components, configuration and operation.

In the illustrated embodiment, the encoder 134 is disposed on, and measures the rotation of, a free-spinning wheel 136 that rests on and rotates along with movement of the conveyor belt 41. The exemplary wheel 136 is suspended from a floating arm 138 that is pivotably mounted to a structural cross-member 46 of the conveyor 40. The exemplary arm 138 engages the cross-member 46 and floats over the conveyor belt 41 via a pivot bracket assembly 139. However, the floating arm 138 may be mounted to any other suitable component and in any other suitable manner. For example, the floating arm 138 may be pivotably mounted to a static beam (not shown) of a weighing device.

In this embodiment, the encoder 134 measures the rotational speed of the wheel 136 as the wheel rotates on a return portion 47 of the conveyor belt 41. However, the wheel 136 may instead rotate on a forward-moving, or primary, portion 54 of the conveyor belt 41. The exemplary encoder 134 provides readings to the controller 124 and/or one or more other components to calculate the speed of the belt 41 based upon the rotational speed of the wheel 136. It should be noted, however, that any other suitable technique and components may be use to measure the speed of the conveyor belt 41.

It should be noted that all embodiments of the material discharge metering system 92 do not require at least one encoder 134 to measure the speed of the conveyor belt 41 or drive pulley 110. When needed or desired, the speed of the conveyor belt 41 or drive pulley 110 may be measured using any other suitable components and techniques.

Referring back to FIGS. 14A-C, in another independent aspect of the present disclosure, the controller 124 may be configured to vary the Actual Discharge Rate. In this embodiment, the electronic controller 124 can vary the speed of the motor 114 (FIG. 14C) and, thus, the speed of the drive pulley 110 and conveyor belt 41, and the amount of material 32 discharged off the end 106 of the conveyor belt 41. For example, the controller 124 may reduce power to the motor 114, slowing the drive pulley 110, conveyor belt 41 and rate of discharge of material 32 off the conveyor 40, or increase power to the motor 114 to cause the opposite results. In this embodiment, based at least partially upon the Actual Discharge Rate, the controller 124 automatically dictates the speed (increase, decrease or no change) of the motor 114. However, the controller 124 may be configured to change the speed of the motor 114 or otherwise vary the Actual Discharge Rate based upon other criteria.

The electronic controller 124 may be configured to vary the speed of the motor 114 in any suitable manner. For example, one or more motor actuator 126 (FIG. 14B) that controls the speed of the motor 114 may be included. In such instances, the system 92 may be configured so that the controller 124 communicates with the motor actuator 126 to vary or maintain the speed of the motor 114.

In the embodiment of FIGS. 14A-C, the motor 114 is a hydraulic motor 116 (FIG. 14C) and the motor actuator 126 is a hydraulic control valve 128 (FIG. 14B). The illustrated controller 124 controls the speed of the motor 116 by controlling the flow of hydraulic fluid from the valve 128 to the motor 116. In other embodiments, a similar arrangement may involve a pneumatic motor (not shown) and pneumatic control valve.

In yet other embodiments, the motor 114 is an electric motor and the motor actuator 126 may include, for example, a variable frequency drive (VFD). In such instances, the controller 124 may provide signals to the VFD to increase, decrease or maintain the speed of the motor 114. Further, in some embodiments, the VFD may (instead of or in addition to one or more encoder 134), determine the speed of the conveyor belt 41 or drive pulley 110 and provide such data to the controller 124 or other component. When included, the VFD may have any suitable form, configuration and operation.

It should be noted that the present disclosure is not limited by the type of motor 114 and/or motor actuator 126. Further, multiple controllers 124, motors 116 and/or motor actuators 126 may be used.

Referring back to FIG. 14B, in some embodiments, the material discharge metering system 92 includes at least one weighing device 140 configured to determine the weight of material 32 on the conveyor belt 41. The output of the weighing device 140 can be used in determining the Actual Discharge Rate. For example, if the system 92 also determines the speed of the conveyor belt 41 or drive pulley 110, such speed data along with weight data from the weighing device 140 can be used by the controller 124 or other suitable component to determine the Actual Discharge Rate without the use of any of the above formulae.

The weighing device 140 may have any suitable form, configuration and operation sufficient to determine the weight of material 32 disposed on the conveyor belt 41. For example, the weighing device 140 may include at least one strain gage load cell 144 as is and become known. In a preferred embodiment, the weighing device 140 includes two strain gage load cells 144. Other possible example types of weighing devices 140 include load sensors and transducers.

When included, the weighing device 140 may be located at any suitable location sufficient to weigh the material 32 provided onto the conveyor belt 41 from the material dispenser 30. As shown in FIG. 14B, for example, the illustrated weighing device 140 is positioned at the "pinch point" between the stinger 100 and the main body 94 of the material dispenser 30, generally proximate to the hinge 104. Since the exemplary stinger 100 is movable about the hinge(s) 104 relative to the main body 94 of the material dispenser 30 and suspended at its far end 102, the stinger 100 will move down when material 32 passes onto or across the portion 108 of the conveyor belt 41 that extends over the stinger 100. As material 32 on the conveyor belt 41 passes over the stinger 100, the illustrated weighing device 140 will measure the change in the weight of the stinger 100. For example, the weighing device 140 may be positioned between a first surface 150 on, extending from or connected with the main body 94, and a second surface 154 on, extending from or connected with the stinger 100. As the stinger 100 drops down from the weight of the material 32 crossing over the belt portion 108, the exemplary weighing device 140 will be squeezed or pinched between the surfaces 150, 154 and take a weight measurement.

For other examples, in FIG. 16B, the illustrated weighing device 140 is engaged with (or below) the drive pulley 110 disposed at the far end 102 of the stinger 100. For example, the drive pulley 110 may be floated on the weighing device 140. As material 32 on the conveyor belt 41 passes over the drive pulley 110, the pulley 110 will drop and the weighing device 140 will take a measurement. In FIGS. 16C and 16D, weighing devices 140 are shown engaged with the cable 118 or lifting arm 120. For example, the weighing device 140 of FIG. 16C is positioned between the cable 118 and the material dispenser 30. In FIG. 16D, a first weighing device 140a is positioned between the cable 118 and the stinger 100, and a second weighing device 140b is positioned between the lifting arm 120 and the stinger 100. When the stinger 100 is in an extended position (such as shown), the illustrated cable 118 and lifting arm 120 are generally in tension between the main body 94 of the material dispenser 30 and the far end 102 of the stinger 100. As material 32 passes onto or over the end 102 of the stinger 100, downward pulling forces will be placed on the cable 118 and lifting arm 120, at which time the respective weighing device 140 will determine the weight of material 32 on the conveyor belt 41.

In another example, FIGS. 17A-B show a weighing device 140 engaged with the conveyor 40 below the portion 108 of the conveyor belt 41 that extends over the stinger 100, such as in-line with the rollers 43. In this embodiment, the weight of the material (not shown) will be determined as it passes over the belt portion 108. It should be noted that the exact position of the material 32 on the conveyor belt portion 108 over the stinger 100 when the weighing device 140 (of any embodiment) takes a weight measurement may vary and is not limiting upon the present disclosure or appended claims. All references above (and in the appended claims) to that position or time should be construed to mean at some time after the material 32 passes on the belt portion 108. It should also be noted that multiple different weighing devices 140 are shown in the Figures for illustrative purposes. While the material discharge metering system 92 may include multiple weighing devices 140, only one weighing device 140 (which may, for example, include one or more strain gage load cells 144) will be sufficient in many applications.

Referring back to FIGS. 14A-C, the system 92 may include any suitable component(s) to determine the Actual Discharge Rate. In some embodiments, such as shown in FIG. 14B, an integrator 160 may be provided to receive output from the weighing device 140 and encoder 134, determine the Actual Discharge Rate and provide it to the controller 124. In other embodiments, the integrator 160 may, for example, receive weight data from the weighing device 140 and speed data from the controller 124 or another source. If included, the integrator 160 may have any suitable form, configuration and operation. For example, the integrator 160 may be a transceiver that has two-way communication with the controller 124, or a transmitter having one-way communication with the controller 124. One example of a presently commercially available integrator 160 is the Deep Universal sold by Rice Lake Weighing Systems under model number 1938837.

If desired, the material discharge metering system 92 may be fully automated to operate on a continuing, real-time basis, according to a pre-programmed time-sequence (e.g. every x minutes) or upon request. In the fully automated, continuing, real-time configuration, the system 92 will effectively meter the amount and rate of material 32 discharged off the discharge end 106 of the conveyor belt 41 as the Actual Rate of Discharge is calculated.

An example operation of the embodiment shown in FIGS. 14A-C and 16A-D in conjunction with a discharge control device 10 (e.g. FIGS. 2-12) or other method (e.g. FIG. 13) of preventing at least substantial spillage of material 32 off the conveyor 40 will now be described with reference to FIG. 19. The exemplary material discharge metering system 92 includes a weighing device 140 and encoder 134, which take (at least substantially) simultaneous weight and pulley speed measurements respectively, such as described above. The exemplary integrator 160 receives the measurements taken by the weighing device 140 and encoder 134 (steps 162, 164) and calculates the Actual Discharge Rate. The Actual Discharge Rate can be calculated in any desired units, such as pounds per minute (PPM) or tons per hour (TPH). In step 166, the integrator 160 provides the Actual Discharge Rate to the controller 124.

Based at least partially upon the Actual Discharge Rate, the exemplary controller 124 commands the motor actuator 126 (step 168) to increase, decrease or maintain the speed of the motor 114 (step 170), which changes or maintains the speed of the drive pulley 110 (step 172), respectively. A change in the speed of the drive pulley 110 will change the speed of the conveyor belt 41 and Actual Discharge Rate. In this example, the controller 124 compares the Actual Discharge rate to a desired discharge rate (e.g. blender demand) input into the controller 124. However, the controller 124 may consider other or different variables, as desired, in determining whether or when to change the speed of the motor 114. If desired, the exemplary system 92 can be configured so that the above process is repeated on an automated, ongoing, real-time basis, which may effectively throttle the motor actuator 126 and motor 114 to cause controlled metering of material 32 off the conveyor 40. This may result in a steady volume of material 32 dispensed onto and delivered by the conveyor belt 41, providing substantially constant compression on the weighing device 140 and, consequently, optimizing its effectiveness.

Now referring to FIG. 20, in embodiments in which the motor 114 is an electric motor and the motor actuator 126 is a VFD, an encoder may not be included. In this example, the weighing device 140 and the VFD may take (at least substantially) simultaneous weight and speed (conveyor belt and/or pulley) measurements, respectively. In step 162, the exemplary weighing device 140 provides weight data to the integrator 160. The illustrated VFD provides conveyor belt and/or pulley speed measurements to the controller 124 (step 165), which, in turn, provides it to the integrator 160 (step 164). The illustrated integrator 160 calculates the Actual Discharge Rate in any desired units, such as pounds per minute (PPM) or tons per hour (TPH). In step 166, the integrator 160 provides the Actual Discharge Rate to the controller 124. The remainder of the description above with respect to FIG. 19 applies similarly to this embodiment. For example, in step 168, based at least partially upon the Actual Discharge Rate, the exemplary controller 124 commands the motor actuator (VFD) 126 to increase, decrease or maintain the speed of the motor 114 (step 170) Likewise, if desired, the exemplary system 92 can be configured so that the above process is repeated on an automated, ongoing, real-time basis, which may effectively throttle the motor actuator 126 and motor 114 to cause controlled metering of material 32 off the conveyor 40.

Referring back to FIG. 14A, in another independent aspect of the present disclosure, the controller 124 may be configured to control the output of material 32 from the material dispenser 30 onto the conveyor 40. For example, when the material dispenser 30 includes multiple material storage compartments 37 and individual gates 38 (e.g. FIG. 7) associated with each dispenser opening 34, the controller 124 may be configured to control operation of the gates 38 between open, closed (and possibly also intermediate) positions to control which compartment(s) 37 provide material 32 onto the conveyor 40 and/or the rate of supply of material 32.

The illustrated controller 124 may control operation of the gates 34 based upon any suitable criteria. For example, one or more sensors 176 may be associated with each material storage compartment 37, configured to determine when the associated compartment 37 is empty and communicate with the controller 124. The sensor 176 may have any suitable form, configuration and operation. An example presently commercially available sensor 176 is the Capacitive Senor sold by Turk under model number BCC10-S30-AP4X-H1141. Upon or after receiving a compartment empty signal from a sensor 176, the exemplary controller 124 is configured to close all gates 34 associated with the empty compartment 37, open all gates 34 associated with one or more other compartment 37, take other action or a combination thereof. For example, if the material dispenser 30 includes three compartments 37 each having two dispenser openings 34 (and associated gates 38), and a fourth compartment 37 having three dispenser openings 34 (and associated gates 38), the illustrated controller 124 is capable of generally concurrently opening and closing all gates 38 associated with each compartment 37. In such instance, the gates 38 are not opened or closed on an individual basis, but on a compartment-by-compartment basis. However, there may be instances where the controller 124 opens and closes the gates 38 on a gate-by-gate basis.

The controller 124 may use other criteria to control the output of material 32 from the material dispenser 30 to the conveyor 40, such as according to a pre-programmed open/close sequence, based upon the type of material 32 in each compartment 37, the proximity of the compartments 37 to the stinger 100, the size or storage capacity of the compartments 37, the amount of material desired to be supplied from a particular compartment 37, the desired material discharge rate, other criteria or a combination thereof.

If desired, the material discharge metering system 92 may be configured to control the output of material 32, such as described above, through the dispenser openings 34 of multiple material dispensers 30 (not shown) all arranged to dispense material 32 onto the conveyor 40. In the embodiment of FIG. 21, for example, the system 92 may be used with any number N of material dispensers 30, such as, for example, 3-6 mobile sand conveying or storage units 36.

The components of the system 92 may be configured to communicate wirelessly, via hard-wiring, such as with cables, or a combination thereof. For example, the controller 124 for each material dispenser 30 may communicate with other component(s) (e.g. the associated actuator(s) 126, integrator(s) 160, sensors 176, other controllers 124, etc.) wirelessly, via cable or other hard-wiring or a combination thereof.

In yet another independent aspect of the present disclosure, the material discharge metering system 92 may be remotely controlled or monitored. In FIG. 21, for example, the system 92 may be remotely controlled or monitored by one or more operator (not shown) with a remote control 180. The remote control 180 may have any suitable form, configuration, features and operation and communicate with other components of the system 92 in any suitable manner. In this embodiment, the remote control 180 communicates wirelessly via Wi-Fi with the electronic controller 124 (e.g. FIG. 14A) of one or multiple material dispensers 30 configured to dispense material 32 onto the conveyor 40. Thus, the operator (not shown) can be off-site, or distanced from the material dispenser(s) 30 and conveyor 40, during operations.

The illustrated remote control 180 includes a display 184, belt speed adjustment knob 188, manual/auto switch 192 and multiple gate open switches 196. In this example, the display 184 can be used to view any desired information from or provided to the remote control 180. Some examples of information may include the desired discharge rate, compartment 37 open/close sequence and information provided by each controller 124, such as empty compartment data 37, Actual Discharge Rate and individual dispenser identifying information (e.g. address, control information, etc).

The exemplary manual/auto switch 192 allows the operator to select between automatic operation of the material discharge metering system 92, such as described above, and manual override. In the manual override mode, the illustrated remote control 180 allows the operator to adjust the speed of the conveyor belt 41 (e.g. FIG. 14A) by turning the belt speed adjustment knob 188. Manual control with the illustrated remote control 180 also allows the operator to open and close all respective gates 38 corresponding with each material storage compartments 37 of each material dispenser(s) 30 with the switches 196. In this example, each gate open switch 196 corresponds with one of the four material storage compartments 37 of a typical mobile sand conveying or storage unit 36 (e.g. FIG. 14A). Flipping a switch 196 will open or close all gates 38 of a particular compartment (of a selected material dispenser 30). The exemplary system 92 allows automatic or manual remote control of gate open, closed and partial-open positions, compartment 37 open/close sequence and conveyor belt 41 speed and may be used to isolate individual material dispensers 30 or groups of dispensers 30, or other functions, all without personnel at the equipment location.

Figure 22:
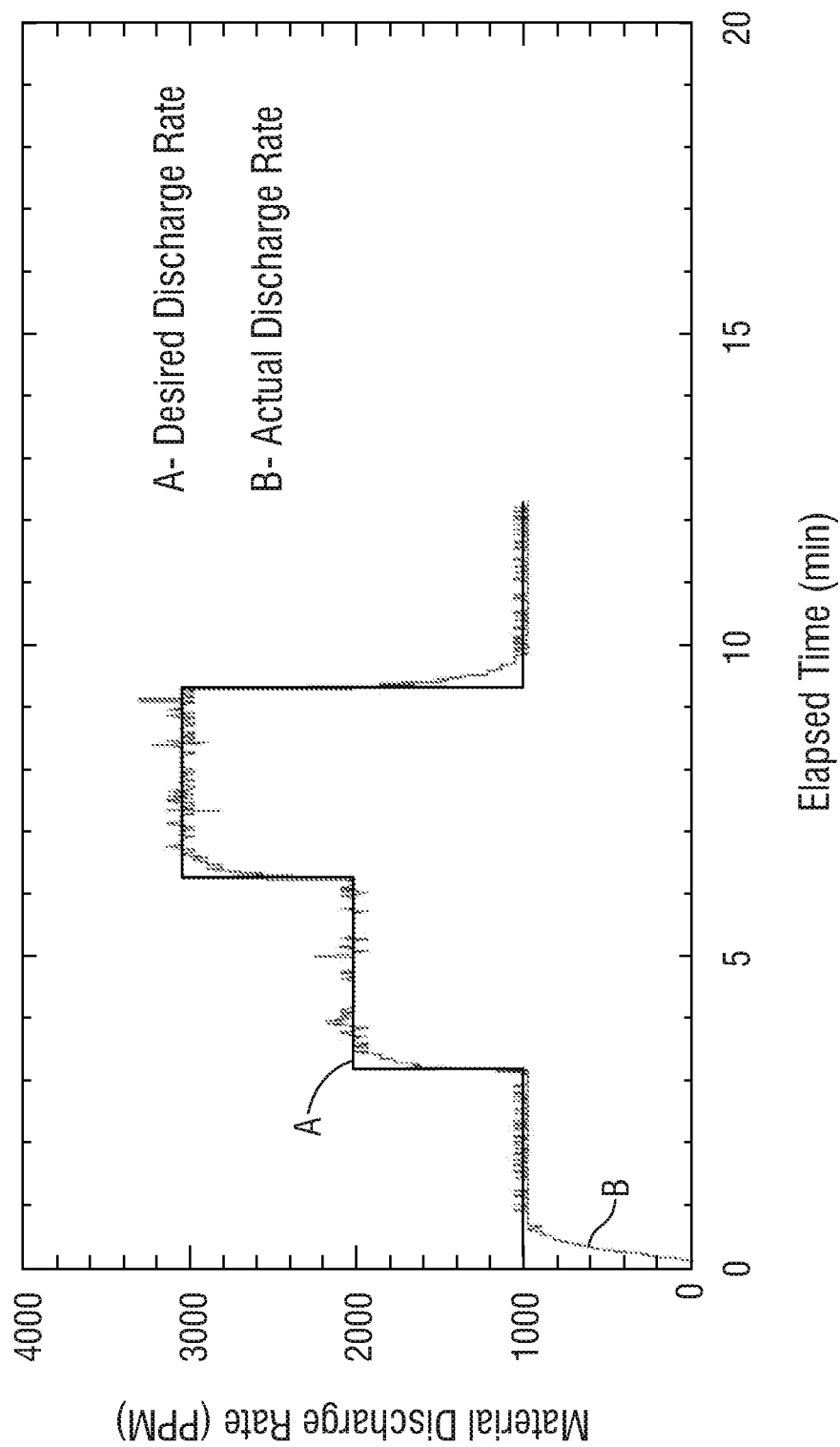
FIG. 22 is a graph showing the results from an example experiment using a material discharge metering system in accordance with an embodiment of the present disclosure.

FIG. 22 illustrates test results from an experiment conducted with an exemplary material discharge metering system 92 used with a material dispenser 30 (mobile sand conveying or storage unit 36), such as the embodiment of FIG. 14A. The material 32 dispensed onto the conveyor 40 from the material dispenser 30 was "5030 White Sand" and the electronic controller 124 was a proportional-integral-derivative (PID) controller. The motor 114 was a hydraulic motor 116 and the motor actuator 126 (e.g. FIG. 14B) was a hydraulic control valve 128. An exemplary weighing device 140 (dual-unit load cells 144), was engaged with the conveyor 40 below the portion 108 of the conveyor belt 41 extending over the stinger 100. An exemplary encoder 134 (e.g. FIG. 16B) was connected to the drive pulley 110. An integrator 160 received real-time, continuing, measurements from the weighing device 140 and encoder 134, calculated the Actual Rate of Discharge based thereupon and transmitted the same to the controller 124 on a continuing basis. The controller 124 compared the Actual Rate of Discharge to a desired rate of discharge (blender demand) provided to the controller 124 and adjusted the speed of the conveyor belt 41 by varying the flow of hydraulic fluid from the valve 128 to the motor 114 to produce the illustrated results. As shown, the Actual Rate of Discharge "B" was adjusted to closely match the desired discharge rate, or demand "A".

Preferred embodiments of the present disclosure thus offer advantages over the prior art and are well adapted to carry out one or more of the objects of this disclosure. However, the present invention does not require each of the components and acts described above and is in no way limited to the above-described embodiments or methods of operation. Any one or more of the above components, features and processes may be employed in any suitable configuration without inclusion of other such components, features and processes. Moreover, the present invention includes additional features, capabilities, functions, methods, uses and applications that have not been specifically addressed herein but are, or will become, apparent from the description herein, the appended drawings and claims.

The methods that may be described above or claimed herein and any other methods which may fall within the scope of the appended claims can be performed in any desired suitable order and are not necessarily limited to any sequence described herein or as may be listed in the appended claims. Further, the methods of the present invention do not necessarily require use of the particular embodiments shown and described herein, but are equally applicable with any other suitable structure, form and configuration of components.

While exemplary embodiments of the invention have been shown and described, many variations, modifications and/or changes of the system, apparatus and methods of the present invention, such as in the components, details of construction and operation, arrangement of parts and/or methods of use, are possible, contemplated by the patent applicant(s), within the scope of the appended claims, and may be made and used by one of ordinary skill in the art without departing from the spirit or teachings of the invention and scope of appended claims. Thus, all matter herein set forth or shown in the accompanying drawings should be interpreted as illustrative, and the scope of the disclosure and the appended claims should not be limited to the embodiments described and shown herein.

The invention claimed is:

1. Apparatus for automatically adjusting the amount of material provided to at least one blender at or near a hydrocarbon well drilling site in order to match the changing demand of material by the blender(s) on an ongoing, real-time basis without human involvement during hydraulic fracturing or related operations, the apparatus including:

a material dispenser having a main body with first and second ends, at least two material storage compartments disposed within said main body, each said material storage compartment having at least one dispenser opening and an electronically-controlled dispenser opening gate associated with each said dispenser opening and configured to be movable between at least one open position and a closed position, each said gate in said at least one open position allowing material to be dispensed from said associated material storage compartment out of said associated dispenser opening during material delivery operations, said gates being arranged and adapted so that material may be discharged concurrently from at least two of said material storage compartments during material delivery operations;

an elongated stinger having first and second ends, said stinger being pivotably coupled to said material dispenser about at least one hinge proximate to said first end of said stinger and said first end of said main body of said material dispenser;

a conveyor belt extending below said dispenser openings and across said stinger, said conveyor belt being arranged and adapted to receive material dispensed from said material dispenser through said dispenser openings, move such material across said stinger and discharge such material off said conveyor belt and said stinger at at least one material discharge point on said conveyor belt for delivery to the at least one blender;

at least one rotatable drive pulley provided on said stinger and arranged and adapted to move said conveyor belt relative to said material dispenser and said stinger;

at least one motor provided on said stinger, coupled to said at least one drive pulley and configured to rotate said at least one drive pulley, wherein the speed of said at least one motor dictates the speed of rotation said at least one drive pulley, which dictates the speed of said conveyor belt and the rate of discharge of material from said conveyor belt and said stinger;

at least one encoder directly coupled to said at least one drive pulley and configured to directly measure the speed of said at least one drive pulley on a real-time, ongoing basis without human involvement;

at least one weighing device adapted to provide real-time measurement of load on said stinger about said hinge on a real-time, ongoing basis without human involvement; and at least one electronic controller configured to receive, on an ongoing basis, differing material demand values from the at least one blender and repeatedly adjust the rate of material discharged off said conveyor belt to match the changing demand of material by the at least one blender on an ongoing, real-time basis without human involvement during hydraulic fracturing or related operations by repeatedly varying the speed of said at least one motor on an ongoing, real-time basis based, at least in part, upon differing blender demand values, the real-time load measurements of said at least one weighing device and the real-time drive pulley speed measurements of said at least one encoder, said at least one electronic controller also configured to control the position of said discharge opening gates to selectively concurrently open at least one gate associated each among at least two said material storage compartments on a real-time, ongoing basis during material delivery operations.

2. The apparatus of claim 1 wherein a pinch point is formed between said stinger and said main body proximate to said hinge and said weighing device is disposed at said pinch point.

3. The apparatus of claim 1 wherein said at least one drive pulley is disposed at said second end of said stinger and at least one said weighing device is engaged with said at least one drive pulley.

4. The apparatus of claim 1 wherein said stinger is at least partially suspended from said material dispenser by at least one cable extending therebetween, further wherein at least one said weighing device is engaged with at least one said cable.

5. The apparatus of claim 4 wherein said at least one weighing device is disposed between at least one said cable and first end of said main body of said material dispenser.

6. The apparatus of claim 4 wherein said at least one said weighing device is disposed between at least one said cable and said stinger.

7. The apparatus of claim 4 further including at least one stinger lifting arm disposed between said stinger and said first end of said main body, wherein at least one said weighing device is disposed between said stinger lifting arm and said stinger.

8. The apparatus of claim 1 wherein said at least one weighing device includes at least one among at least one load cell, load sensor and transducer.

9. The apparatus of claim 1 further including a motor actuator configured to control the speed of said at least one motor, wherein said at least one electronic controller is arranged and adapted to actuate said motor actuator to vary the speed of said at least one motor.

10. The apparatus of claim 9 wherein said at least one motor is a fluid-powered motor and said motor actuator is a fluid control valve that provides fluid to said at least one motor to drive said at least one motor, wherein said at least one electronic controller is configured to vary the speed of said conveyor belt by dictating the amount of fluid provided from said fluid control valve to said at least one motor.

11. The apparatus of claim 1 further including at least one electronic integrator in data communication with said at least one encoder, said at least one weighing device and said at least one electronic controller, said at least one electronic integrator being arranged and adapted to receive data from said at least one encoder and said at least one weighing device and calculate an actual rate of discharge of material off said conveyor belt and said stinger based thereupon on an ongoing, real-time basis, and communicate the actual rate of discharge values to said at least one electronic controller on a real-time, ongoing basis, further wherein said at least one electronic controller is arranged and adapted to compare the actual rate of discharge values to the differing material demand values from the at least one blender on a real-time, ongoing basis, to determine when and how much to vary the speed of said at least one motor.

12. The apparatus of claim 1 further including a discharge control device coupled to each said gate, each said discharge control device being moveable with its associated said gate relative to said material dispenser into at least one open-flow position, each said discharge control device in said at least one open-flow position being configured to allow material to flow from said material dispenser through said associated discharge opening onto said conveyor belt, and level the top of the material dispensed onto said conveyor belt and prevent at least some of the material dispensed onto said conveyor belt from overflowing off said conveyor belt and as said conveyor belt moves relative to said material dispenser.

13. Method of automatically adjusting the amount of material provided to at least one blender at or near a hydrocarbon well drilling site in order to match the changing demand of material by the blender(s) on an ongoing, real-time basis without human involvement during hydraulic fracturing or related operations, the method including:

positioning the first end of an elongated stinger proximate to the first end of a material dispenser;

the stinger being pivotably coupled to the material dispenser about at least one hinge proximate to the first end of the stinger and the first end of the material dispenser;

a conveyor belt extending under at least two storage compartments of the material dispenser and across the stinger;

at least one drive pulley carried on the stinger driving the conveyor belt;

directly coupling at least one encoder to the at least one drive pulley;

the material dispenser concurrently providing material onto the conveyor belt from at least two storage compartments of the material dispenser;

the conveyor belt receiving material dispensed from the material dispenser, moving such material across the stinger and discharging such material off the conveyor belt and stinger at at least one material discharge point located proximate to a second end of the stinger, the material discharged therefrom to be provided to the at least one blender;

the at least one encoder directly measuring the speed of the at least one drive pulley on a real-time basis during material delivery operations and providing real-time measurements of the speed of the at least one drive pulley on an ongoing basis;

at least one motor carried on the stinger driving the at least one drive pulley, wherein the speed of the at least one motor dictates the speed of rotation the at least one drive pulley, which dictates the speed of the conveyor belt and rate of discharge of material off the conveyor belt;

positioning at least one weighing device on the stinger at one or more location other than directly below the conveyor belt;

the at least one weighing device providing data for determining real-time measurement of load on said stinger about said hinge on an ongoing basis; and at least one electronic controller receiving differing material demand values from the blender on an ongoing basis and repeatedly adjusting the rate of material discharged off the conveyor belt to match the changing demand of material of the blender(s) without human involvement by automatically, repeatedly varying the speed of the at least one motor on an ongoing, real-time basis based, at least in part, upon differing blender demand values, real-time drive pulley speed measurements and real-time load measurements on the stinger.

14. The method of claim 13 further including the at least one electronic controller controlling a motor actuator coupled to the at least one motor to vary the speed of the at least one motor.

15. The method of claim 14 wherein the at least one motor is a fluid-powered motor and the motor actuator is a fluid control valve that provides fluid to the motor to drive the motor, further including the at least one electronic controller varying the speed of the conveyor belt by dictating the amount of fluid provided from the fluid control valve to the at least one fluid-powered motor.

16. The method of claim 13 wherein each storage compartment of the material dispenser has at least one dispenser opening disposed proximate to the bottom thereof and an electronically-controlled dispenser opening gate associated therewith and configured to be moved between at least one open position and a closed position, each gate in at least one open position allowing material to be dispensed from the its associated storage compartment out of its associated dispenser opening during material delivery operations, further including the at least one electronic controller adjusting the position the gates to selectively concurrently open at least one gate associated with each among at least two storage compartments on a real-time, ongoing basis during material delivery operations.

17. The method of claim 13 further including coupling a distinct discharge control device to each gate, at least two discharge control devices moving into at least one open-flow position and allowing material to flow concurrently from the material dispenser through their associated discharge openings onto the conveyor belt, levelling the top of material dispensed onto the conveyor belt and preventing at least some of the material dispensed onto the conveyor belt from overflowing off the conveyor belt as the conveyor belt moves relative to the material dispenser.

18. The method of claim 13 further including at least one electronic integrator receiving data from the at least one encoder and the at least one weighing device, calculating an actual rate of discharge of material off the conveyor belt and stinger based upon such data on an ongoing, real-time basis, and communicating the actual rate of discharge values to the at least one electronic controller on a real-time, ongoing basis, further including the at least one electronic controller comparing the actual rate of discharge values to the differing material demand values of the at least one blender on a real-time, ongoing basis, to determine when and how much to vary the speed of the at least one motor.

19. The method of claim 13 wherein the at least one weighing device is disposed at a pinch point formed between the stinger and the material dispenser proximate to said hinge.

20. The method of claim 13 further including engaging at least one weighing device with at least one drive pulley.

* * * * *

UNITED STATES PATENT AND TRADEMARK OFFICE
CERTIFICATE OF CORRECTION

PATENT NO.         : 10,106,332 B2
APPLICATION NO.    : 15/042638
DATED              : October 23, 2018
INVENTOR(S)        : Brent Naizer and Ronnie Hughs Page 1 of 1

It is certified that error appears in the above-identified patent and that said Letters Patent is hereby corrected as shown below:

In the Claims

Column 22, Line 64, Claim 1, after "the speed of rotation", insert -- of --.

Column 23, Line 44, Claim 5, after "and", insert -- said --.

Column 24, Line 67, Claim 13, after "the speed of rotation", insert -- of --.

Column 25, Line 5, Claim 13, delete "location", and insert -- locations --.

Column 25, Line 37, Claim 16, delete "the".

Column 26, Line 4, Claim 16, after "position", insert -- of --.

Signed and Sealed this
Fourth Day of December, 2018

Andrei Iancu
*Director of the United States Patent and Trademark Office*